(12) United States Patent
Osogami

(10) Patent No.: US 8,201,174 B2
(45) Date of Patent: Jun. 12, 2012

(54) TECHNIQUE OF DETERMINING PERFORMING ORDER OF PROCESSES

(75) Inventor: Takayuki Osogami, Yamato (JP)

(73) Assignee: International Business Machines Corporation, Armonk, NY (US)

(*) Notice: Subject to any disclaimer, the term of this patent is extended or adjusted under 35 U.S.C. 154(b) by 1051 days.

(21) Appl. No.: 12/127,276

(22) Filed: May 27, 2008

(65) Prior Publication Data

US 2008/0301679 A1 Dec. 4, 2008

(30) Foreign Application Priority Data

May 30, 2007 (JP) ................. 2007-143969

(51) Int. Cl.
G06F 9/46 (2006.01)
G01M 17/00 (2006.01)
(52) U.S. Cl. .............. 718/102; 718/103; 701/33
(58) Field of Classification Search ............ None
See application file for complete search history.

(56) References Cited

U.S. PATENT DOCUMENTS 7,165,252 B1 * 1/2007 Xu ............... 718/102

FOREIGN PATENT DOCUMENTS

| JP | 05-174092 | 7/1993 |
|---|---|---|
| JP | 2000-029919 | 1/2000 |
| JP | 2000-235591 | 8/2000 |
| JP | 2003-030395 | 3/2003 |
| JP | 2004-030661 | 1/2004 |
| JP | 2005-135323 | 5/2005 |

OTHER PUBLICATIONS

Eppinger, Steven D.; Model-based Approaches to Managing Concurrent Engineering; Journal of Engineering Design, vol. 2, No. 4,1991.
Browning Tyson R.; Applying the Design Structure Matrix to System Decomposotion and Integration Problems: IEEE vol. 48, No. 3, Aug. 2001.
Eppinger, Steven D., Smith Robert P.; A Predictive Model of Sequential Iteration in Engineering Design; Management Science/vol. 43, No. 8, Aug. 1997.
Rogers James L., McCULLEY Collin M., Bloebaum Christina L.; Integrating a Genetic Alogorithm Into a . . . State University of New York at Buffalo, Apr. 1996.

* cited by examiner

Primary Examiner — Emerson C. Puente
Assistant Examiner — Camquy Truong
(74) Attorney, Agent, or Firm — Vazken Alexanian

(57) ABSTRACT

The present invention provides to a technique of determining a performing order of processes. In particular, the present invention relates to a technique of optimizing a performing order of processes in such a case that a result of performing a previous process could be modified later depending on a performing order of processes. The invention further provides a method to determine a performing order of processes so as to minimize required time for a process of modifying a result of an already performed process based on a result of a process performed later.

28 Claims, 26 Drawing Sheets

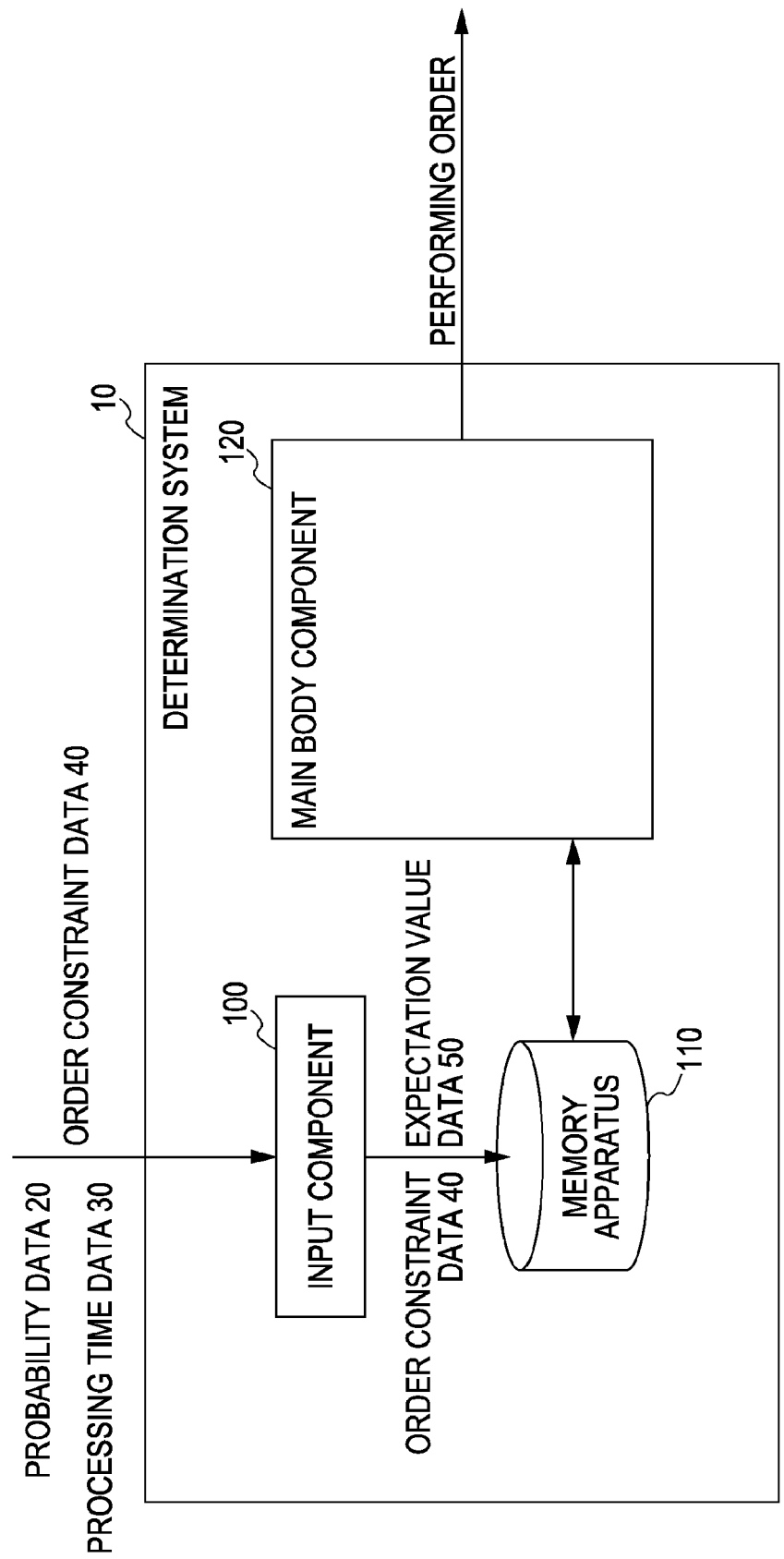

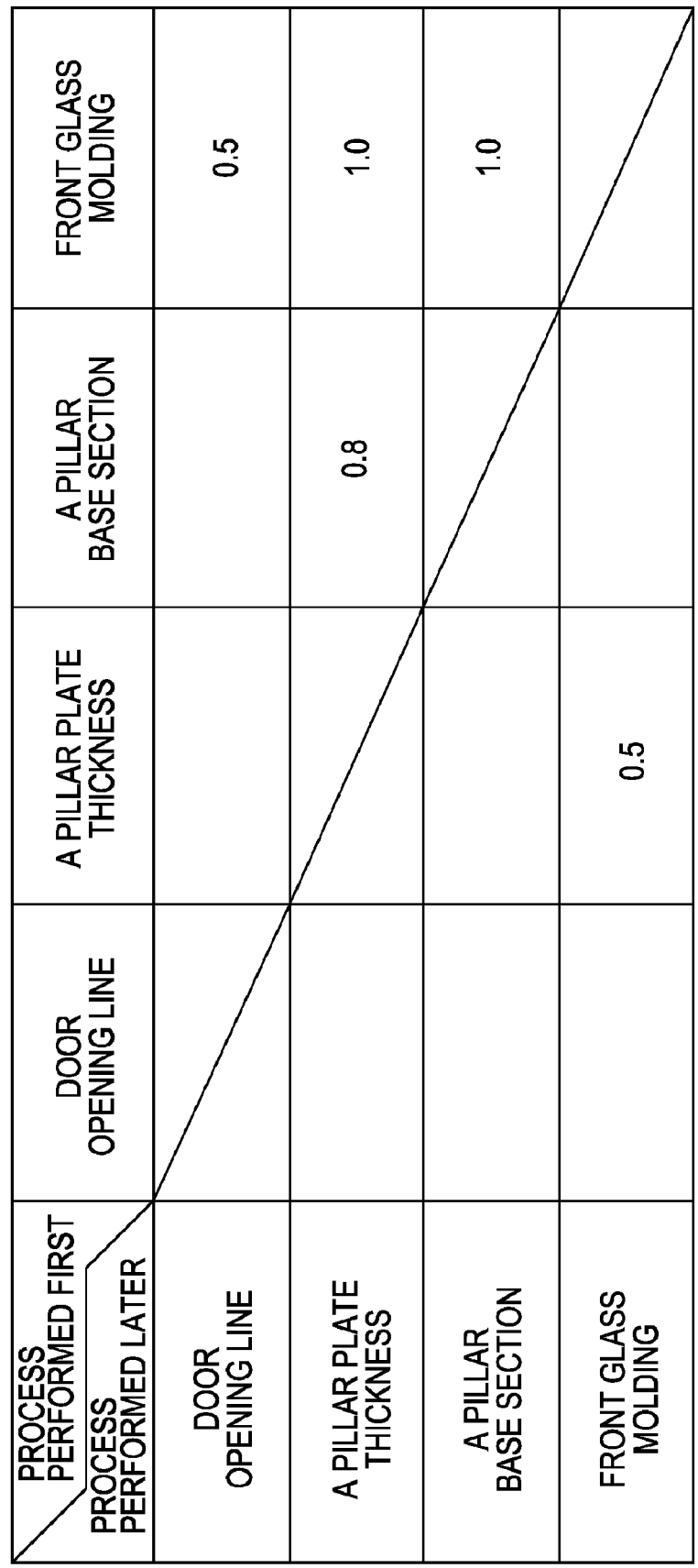

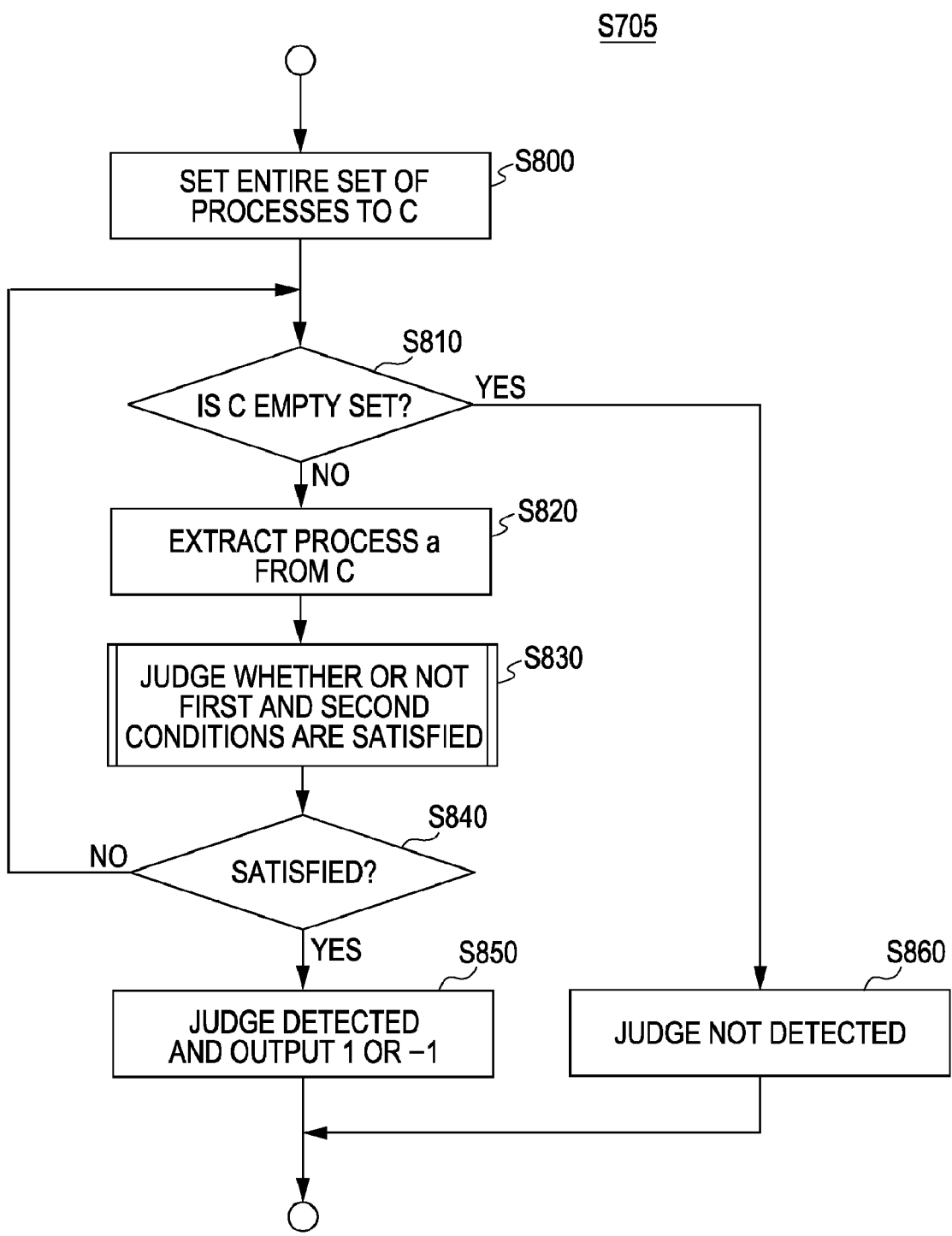

⇒ ORDER IS DETERMINED

→ ORDER IS NOT DETERMINED AND CORRECTION TIME IS SHORTENED IF PROCESSES ARE PERFORMED IN THIS ORDER

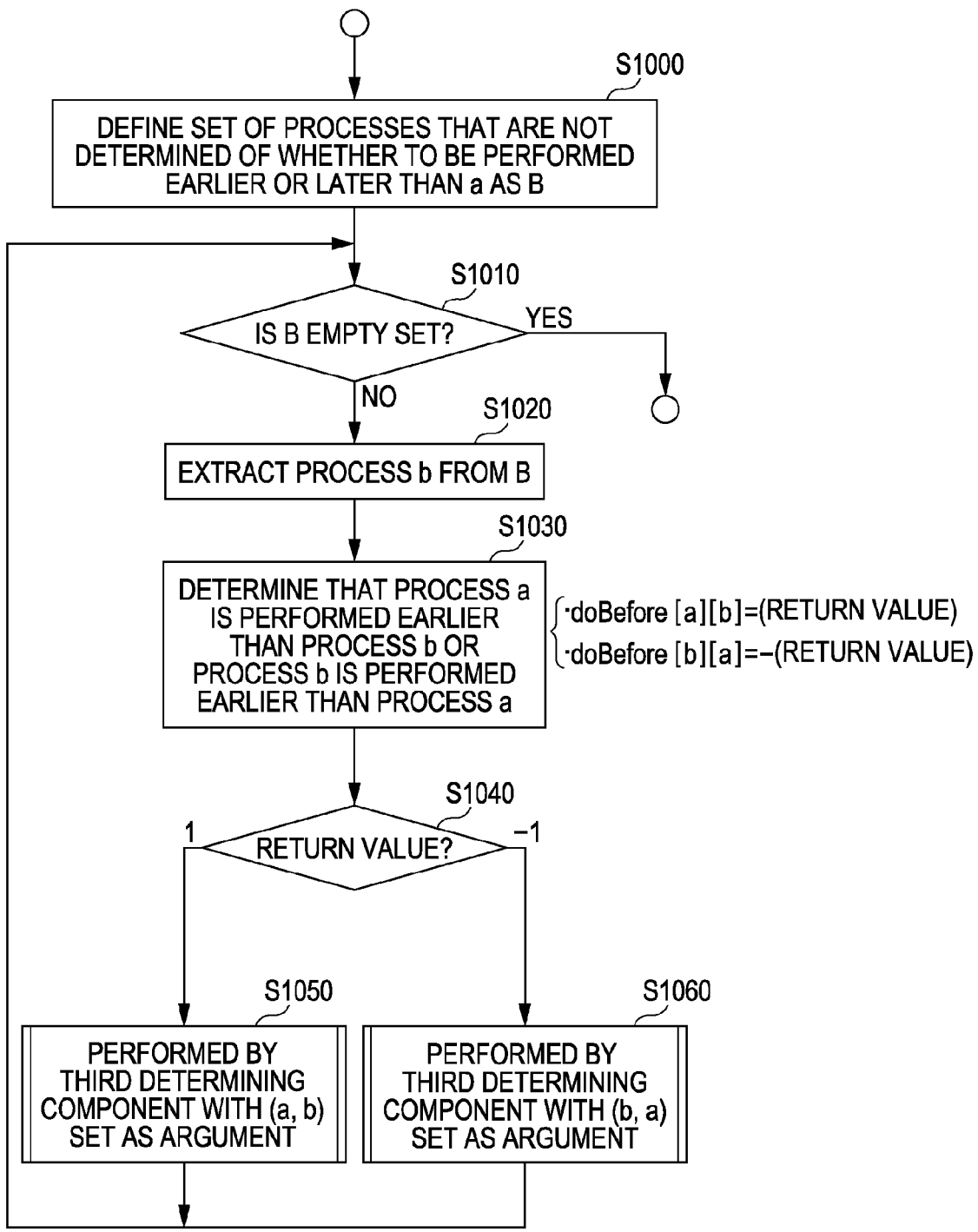

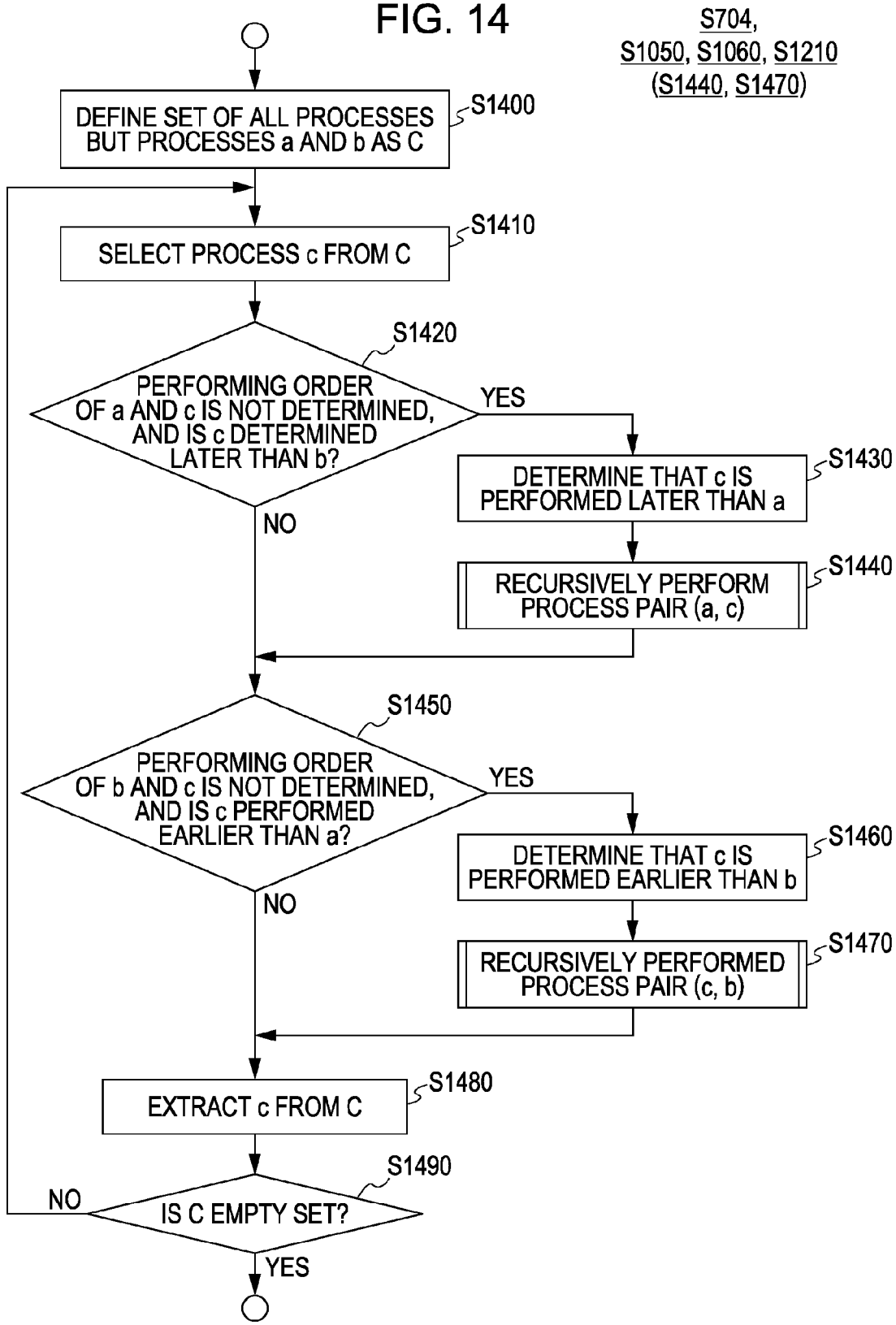

|   | e | f | s | t | u | v | o | x | p | z |
|---|---|---|---|---|---|---|---|---|---|---|
| e |   | 1 | 1 | 1 | 1 | 1 | 1 | 1 | 1 | 1 |
| f | -1 | 1 | 0 | 0 | 0 | 0 | 0 | 0 | 0 | 0 |
| s | -1 | 0 | 1 | 1 | 0 | 0 | -1 | 0 | 0 | 0 |
| t | -1 | 0 | 0 | 1 | 1 | 0 | -1 | 0 | 0 | 0 |
| u | -1 | 0 | 0 | 0 | 1 | 1 | -1 | 0 | 0 | 0 |
| v | -1 | 0 | 0 | 0 | 0 | 1 | 0 | 0 | 0 | 0 |
| o | -1 | 0 | 0 | 0 | 0 | 0 | 1 | 1 | 0 | 0 |
| x | -1 | 0 | 0 | 0 | 0 | 0 | 0 | 1 | 0 | -1 |
| p | -1 | 0 | 0 | 0 | 0 | 0 | 0 | 0 | 1 | 0 |
| z | -1 | 0 | 0 | 0 | 0 | 0 | 0 | 0 | 0 | 1 |

NEW CONSTRAINT ON ASSUMPTION THAT e IS DETERMINED TO BE PERFORMED FIRST

US 8,201,174 B2

TECHNIQUE OF DETERMINING PERFORMING ORDER OF PROCESSES

CROSS-REFERENCE TO RELATED APPLICATION

This application claims priority under 35 U.S.C. §119 from Japanese Patent Application No. 2007-143969 filed May 30, 2007, the entire contents of which are incorporated herein by reference.

FIELD OF INVENTION

The present invention relates to a technique of determining a performing order of processes. More particular, the present invention relates to a technique of optimizing a performing order of processes in such a case that a result of performing a previous process could be modified later depending on a performing order of processes.

BACKGROUND OF THE INVENTION

How to reduce a period up to completion is important in a design process of a product such as an automobile from the viewpoint of costs and profits. For the purpose of reducing working hours of an engineer, a technique of automatically determining the best design or automatically calculating an optimized value of target parameters has been proposed. Various optimization methods have been proposed. A technique of automatically optimizing a target parameter value in a design process, a technique of optimizing a layout of a wall panel, a technique of optimizing parameters of a circuit in a circuit design are all examples that have been disclosed.

However, it is very complicated to design an automobile and its parts, so there has not yet been proposed a technique of automatically designing these with a computer. Further, the design of a large-scale product such as an automobile requires a large number of processes. Moreover, these processes depend on each other in some cases. Thus, it is very difficult to determine which process is performed first. For example, if certain two processes depend on each other, a result of an already performed process has to be modified to be consistent with a result of a process performed later irrespective of a performing order of these processes, in some cases. The required time for the modification varies depending on a performing order of the processes. Hence, unless a performing order of processes is appropriately determined, the sum of the times required for the modification would considerably increase, leading to reduction in the whole efficiency for the design.

Techniques of appropriately determining a working procedure are given as references. These techniques could be applied to a performing order of the design processes of the automobile. However, if the technique of Non-Patent Document 1 is applied to the automobile, calculation for determining a performing order cannot be completed within a practical period due to too many processes. In addition, the techniques to determine the best performing order, so the performing order might leave room for improvement.

Accordingly, it is an object of the present invention to provide a system, a method, and a program product, which can overcome the above problems. The object can be attained by combining features specified in independent claims in the scope of claims. In addition, dependent claims specify more advantageous examples of the present invention.

SUMMARY OF THE INVENTION

To attain the above object, a first aspect of the present invention provides a system for determining a performing order of a plurality of processes, including: a memory device that stores, for each combination of processes, the expected value of the time required to carry out a modification necessary for matching a result of performing one of the plurality of processes to a result of performing another one of the plurality of processes, when the one of the plurality of processes is performed before the other one of the plurality of processes is performed; a first judging device that judges whether or not a first condition, that the expected value of the time to perform a primary process before a secondary process is smaller than the expected value of the time to perform a secondary process before a primary process, is satisfied, for each combination of processes in the plurality of processes in which a primary process can be carried out before a secondary process, in accordance with each expected value read from the memory device; a first determining device that determines to perform the primary process before the secondary process when the first condition is satisfied; and a scheduling device that determines a performing order of remaining processes in the plurality of processes in accordance with the performing order determined by the first determining device, and outputs the performing order determined. Further, the present invention provides a program product that causes a computer to function as the system, and a method of determining a performing order of processes with the system.

Incidentally, the summary of the invention does not list all features of the present invention, and a sub-combination of these features can be included in the scope of the invention.

BRIEF DESCRIPTION OF THE DRAWINGS

FIG. 1 shows the overall configuration of a determination system 10 according to an embodiment of the present invention.

FIG. 2a shows a first example of data structure of the probability data 20 of this embodiment.

FIG. 2b shows a second example of the data structure of the probability data 20 of this embodiment.

FIG. 3b shows a second example of the data structure of the processing time data 30 of this embodiment.

FIG. 5 shows an example of a data structure of the expected value data 50 of this embodiment.

FIG. 8 is a detailed flowchart of the process in S705.

FIG. 10 is a detailed flowchart of the process in S720.

FIG. 14 is a detailed flowchart of processes common to S704, S1050, S1060, and S1210.

FIG. 19 shows an example of the sub-problem data 175 output from the scheduling component 650 of this embodiment.

REFERENCE NUMERALS

Figure 3A:
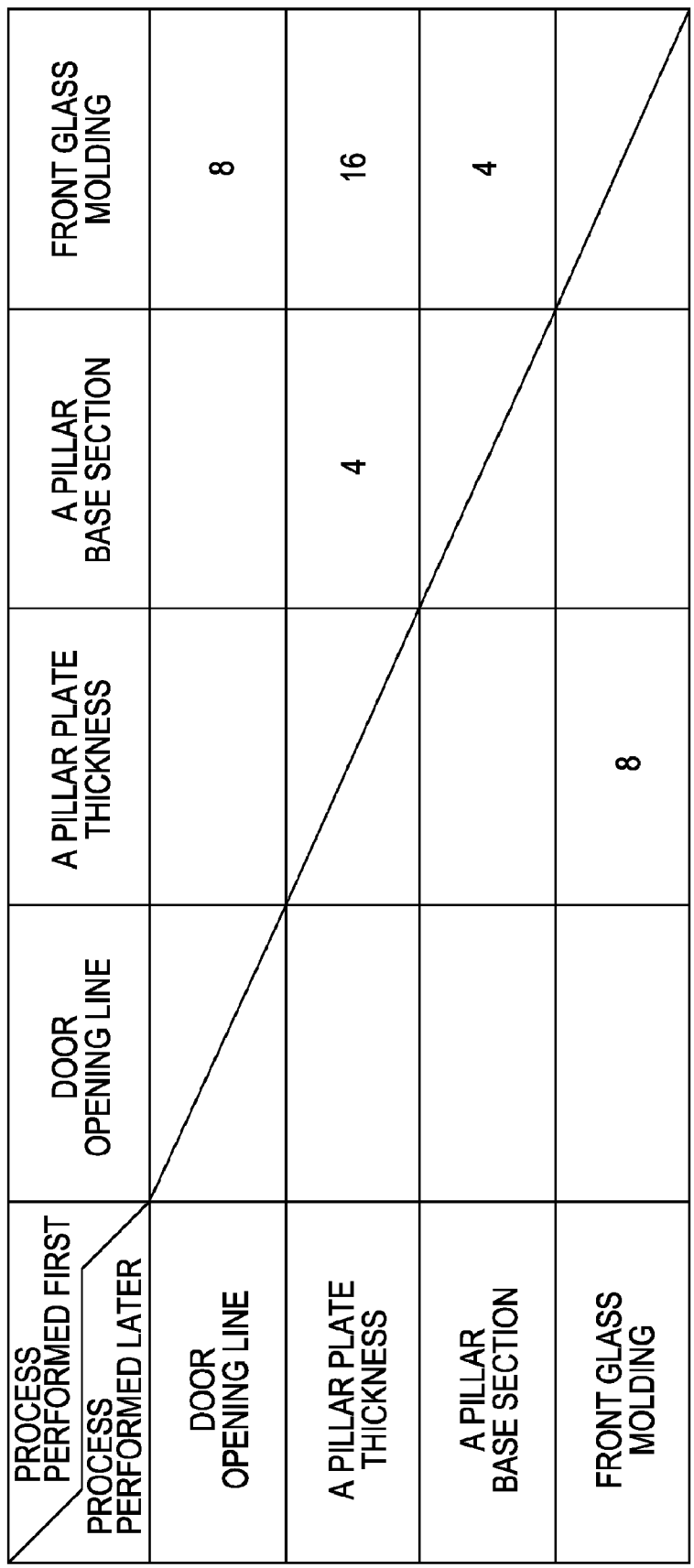
FIG. 3a shows a first example of a data structure of the processing time data 30 of this embodiment.

10: determination system
20: probability data
30: processing time data
40: order constraint data
50: expected value data
100: input component
110: memory device
120: main body component
150: sub-order data
160: performing order data
170: undetermined data
175: sub-problem data
600: first judging component
610: first determining component
620: third determining component
630: second judging component
640: second determining component
650: scheduling component

DETAILED DESCRIPTION OF THE PREFERRED EMBODIMENTS

Hereinafter, the present invention will be described based on embodiments, but the following embodiments should not be construed as limiting the inventions as described in the scope of claims, and every possible combinations of features described in the embodiments are not necessarily indispensable as solving means of the present invention.

FIG. 1 shows the overall configuration of a determination system 10 according to an embodiment of the present invention. The determination system 10 includes an input component 100, a memory device 110, and a main body component 120. The input component 100 receives input probability data 20, processing time data 30, and order constraint data 40. The probability data 20 represents a probability that a modification is performed for matching a result of performing one of the plurality of processes to a result of performing another one of the plurality of processes, when the one of the plurality of processes is performed before the other one of the plurality of processes is performed, for each combination of processes. The processing time data 30 represents processing time for matching a result of performing one of the plurality of processes to a result of performing another one of the plurality of processes, when the one of the plurality of processes is performed before the other one of the plurality of processes is performed, for each combination of processes. The order constraint data 40 includes constraints that a certain process, a primary process, must be performed before the other process, a secondary process.

The input component 100 calculates the product of the received probability and processing time for each combination of processes, and generates expected value data 50 that represents an expected value of time required to carry out a modification to store the generated data in the memory device 110. Further, the input component 100 stores the received order constraint data 40 in the memory device 110. The main body component 120 determines and outputs the best performing order of processes that minimizes the expected value of time required to carry out modifications, on the basis of the above data, so that all processes can be completed with no contradiction in design.

Figure 2B:
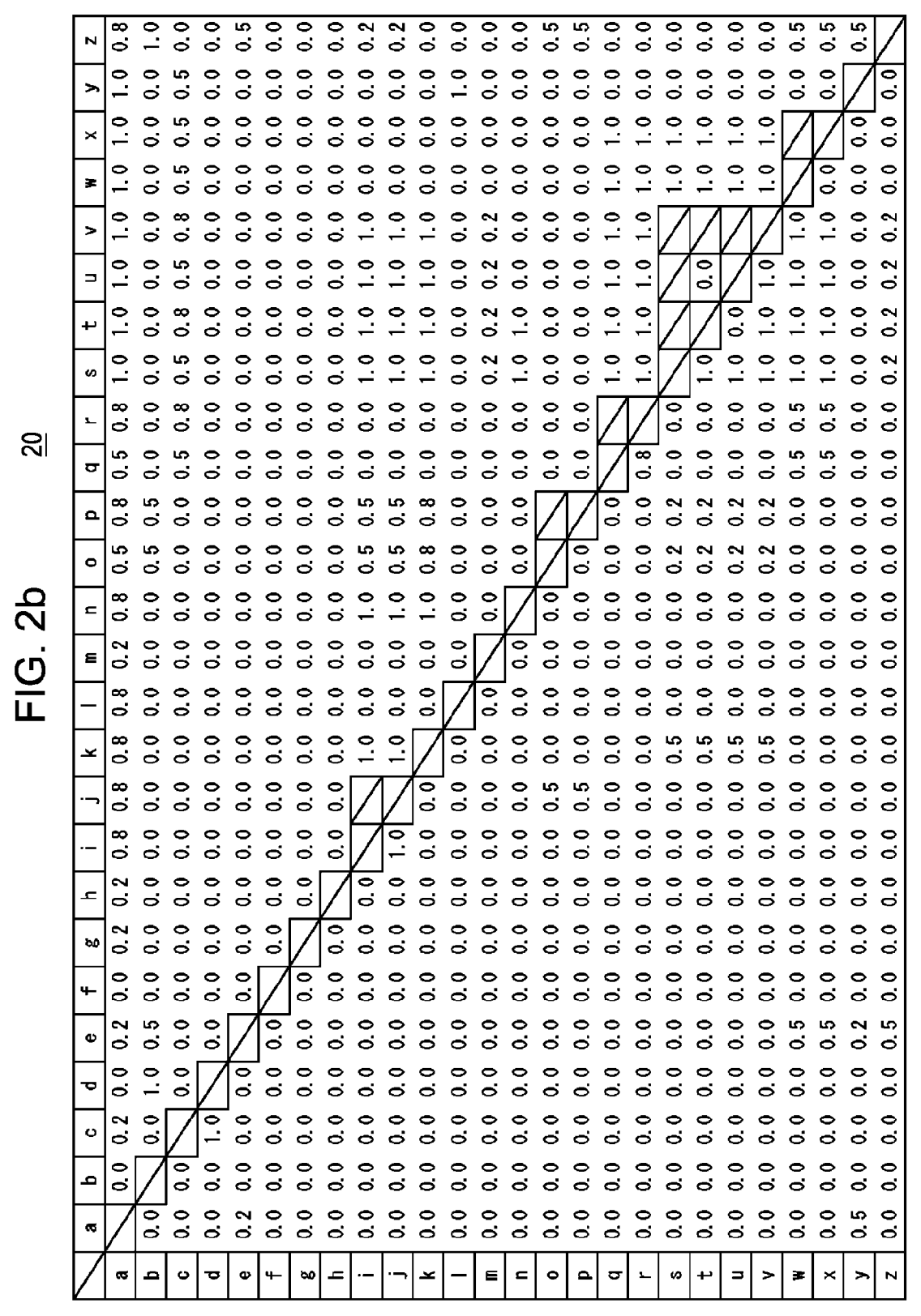

FIG. 2a shows a first example of data structure of the probability data 20 of this embodiment. Each process is previously determined to design a part of a product such as an automobile upon designing the product. Here, the term, a part of the product, means a portion or components of the product. For example, four processes of FIG. 2a are processes for determining a design of portions or components of the automobile, that is, "door opening line", "A-pillar plate thickness", "A-pillar base section" and "front glass molding". To determine a portion or component means to determine at least one of a shape and a material of the portion or component. More specifically, determination of the design for a component includes determination of length, width, thickness, angle, or other such values for determining a shape of the component. In addition, each process may be previously determined to determine a design of a step of a manufacturing process of the product. For example, each process may determine at least one of a shape and the number of molds used in a manufacturing process for press-molding a metal plate.

As understood from the probability data 20 of FIG. 2a, in the case of performing a process of determining a design for the A-pillar plate thickness before a process of determining a design for the A-pillar base section, the design for the A-pillar plate thickness should be modified to be made consistent with the design for A-pillar base section determined in a previous process with a probability of 80%. The same definition of values applies to the other combination of processes. For example, if the A-pillar plate thickness is determined first, followed by determination of the front glass molding, the design of the front glass molding should be modified because of a contradiction between the design of the front glass molding and the already determined A-pillar plate thickness with a probability of 50%. The blank indicates that no modification is required, that is, the probability of 0%.

FIG. 2a illustrates some processes extracted from a number of processes necessary for determining a product design by way of example. FIG. 2b shows a result of extending/generalizing the illustrated example, and schematizing the probability of occurrence of a modification in 26 processes.

FIG. 2b shows a second example of the data structure of the probability data 20 of this embodiment. In the second example, identifiers in each process are denoted by one letter of the alphabet. In practice, specific design values, that is, which part of a product or production process is determined or which value is determined, are previously determined in association with individual processes. Further, identifiers of processes performed previously are arranged in the row direction, and identifiers of processes performed subsequently are arranged in the column direction, and a numerical value corresponding to each combination of processes represents a probability of occurrence of a modification. To given an example thereof, if a process c is performed first, and a process a is performed later (not necessarily next to the process c), the probability of modification of a result of the process c is 20%.

As described above, the numerical values representing the probability as shown in FIGS. 2a and 2b may be determined and input by an engineer who designs a product, or calculated on the basis of a report written in past upon designing a similar product and input. Herein below, the probability of occurrence of a modification necessary for matching a result of the process a to a result of the process b in the case of performing the process b after the process a is represented by p[b] [a] based on a function p.

FIG. 3a shows a first example of a data structure of the processing time data 30 of this embodiment. The example of FIG. 3a corresponds to a process of determining a design for "door opening line", "A-pillar plate thickness", "A-pillar base section" and "front glass molding" as the four processes of FIG. 2a. The processing time data 30 represents average processing time for design change necessary for matching a design determined in one process to a design determined in the other process in the case of performing the other process after the one process in every pair of any two of the four processes.

To be specific, in the case of performing a process of determining a design for the A-pillar plate thickness after a process of determining a design for the A-pillar base section, average required time for modifying the previously designed A-pillar base section is 4 hours. The same definition of numeral values applies to the other pairs of processes. For example, if the A-pillar plate thickness and the front glass molding are designed in this order, average required time for modifying the previously designed A-pillar plate thickness is 8 hours.

Figure 3B:
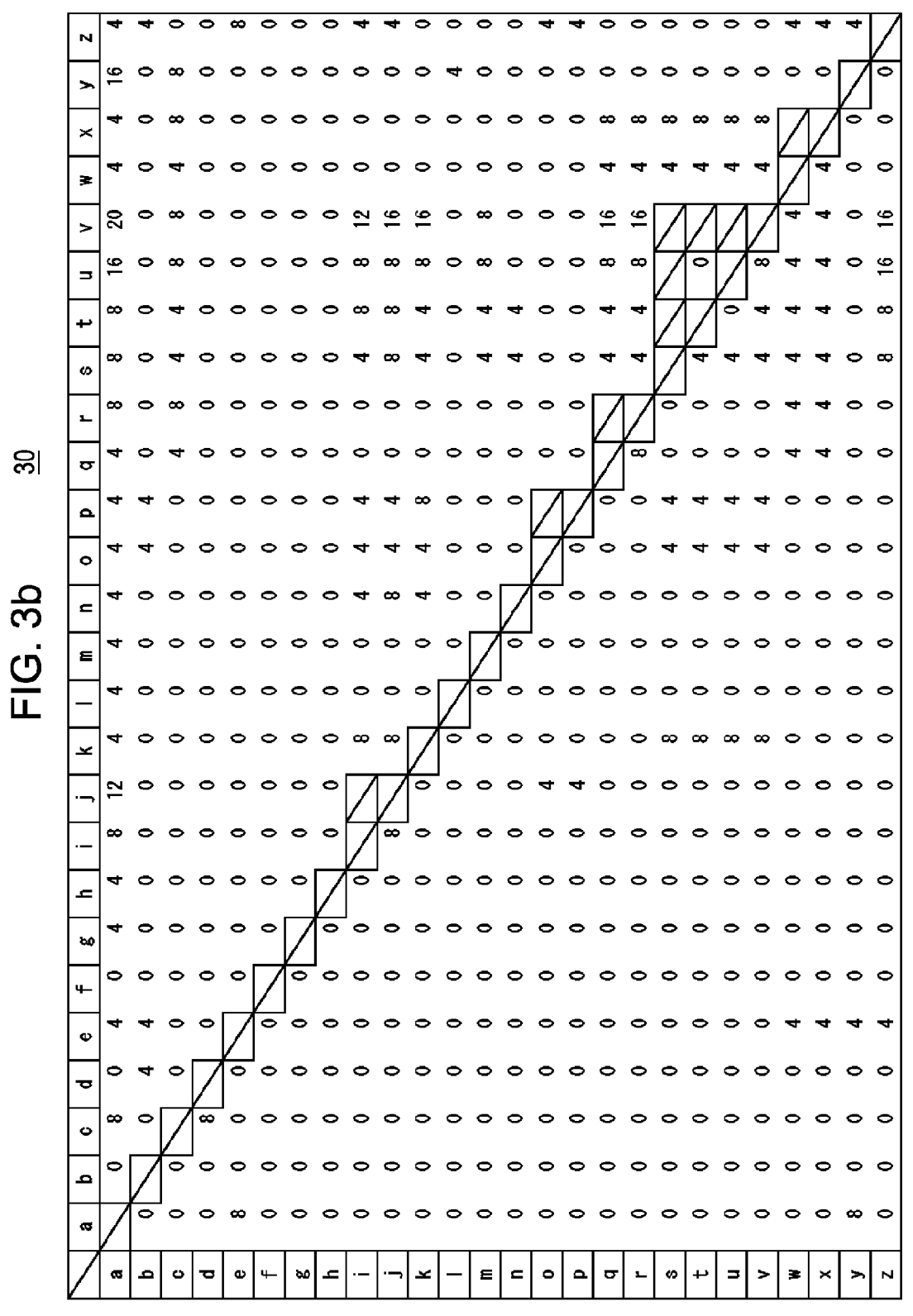

FIG. 3a illustrates some processes extracted from a number of processes necessary for determining a product design by way of example. FIG. 3b shows a result of extending/generalizing the illustrated example, and schematizing the probability of occurrence of a modification in 26 processes.

FIG. 3b shows a second example of the data structure of the processing time data 30 of this embodiment. The second example corresponds to the probability data 20 of FIG. 2b, and identifiers in each process are denoted by one letter of the alphabet. In practice, specific design values, that is, which part of a product or production process is determined or which value is determined, are previously determined in association with individual processes. Further, identifiers of processes performed previously are arranged in the row direction, and identifiers of processes performed subsequently are arranged in the column direction, and a numerical value corresponding to each combination of processes represents average processing time for modification. To given an example thereof, if the process c is performed first, and the process a is performed later, average processing time required for modification of a result of the process c is 8 hours.

As described above, the numerical values representing the processing time required for modification as shown in FIGS. 3a and 3b may be determined and input by an engineer who designs a product, or calculated on the basis of a report written in past upon designing a similar product and input. Herein below, processing time required for modification for matching a result of the process a to a result of the process b in the case of performing the process b after the process a is represented by w[b] [a] based on a function w.

Figure 4:
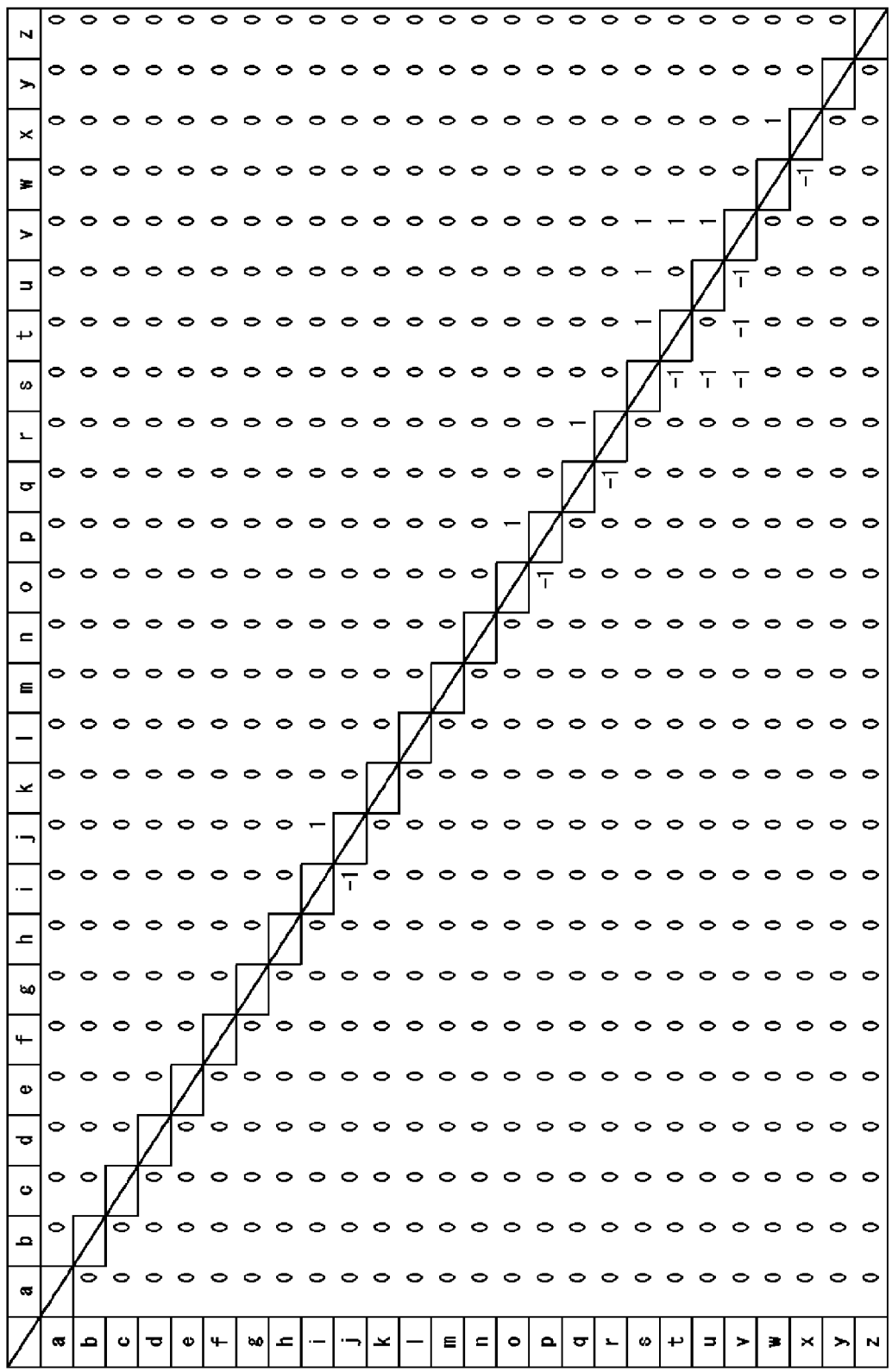
FIG. 4 shows an example of a data structure of the order constraint data 40 of this embodiment.

FIG. 4 shows an example of a data structure of the order constraint data 40 of this embodiment. In some particular combination of processes, unless one of the processes is performed first, the other process cannot be performed at all. The input component 100 receives input data about the order constraint data 40 that represents the particular combinations of processes and a performing order thereof. In the example of the order constraint data 40 of FIG. 4, identifiers in each process are denoted by one letter of the alphabet. In practice, specific design values, that is, which part of a product or production process is determined or which value is determined, are previously determined in association with individual processes. Further, identifiers of processes performed previously are arranged in the column direction, and identifiers of processes performed subsequently are arranged in the row direction.

An order constraint that a certain process a is performed previously, and a process b is performed after the process a is expressed by constraint (a, b)=1 and constraint (b, a)=−1. That is, "1" represents that the order constraint that processes must be performed in a certain performing order is imposed, and "−1" represents that the order constraint that processes must be performed in a reverse order thereof is imposed. FIG. 4 shows numerical values of such function, constraint, for any permutations of any two processes. To give an example thereof, a process i must be performed before a process j.

To give another example thereof, the input component 100 may not receive the input order constraint data 40. In this case, the input component 100 receives the input probability data 20 and the processing time data 30 that reflect the order constraint to the probability of occurrence of a modification and the modification time. For example, the probability data 20 may include a very large value, for example, 100% as a probability of occurrence of a modification if processes are performed in the order counter to the order constraint. Likewise, the processing time data 30 includes a very large value, for example, modification time equal to the maximum modification time among the values of every combination of processes, as modification time required for performing processes in the order counter to the order constraint. As described above, it is not dispensable to input the order constraint data 40, and a performing order can in practice be determined by reflecting the order constraint without using the order constraint data 40.

Figure 5:
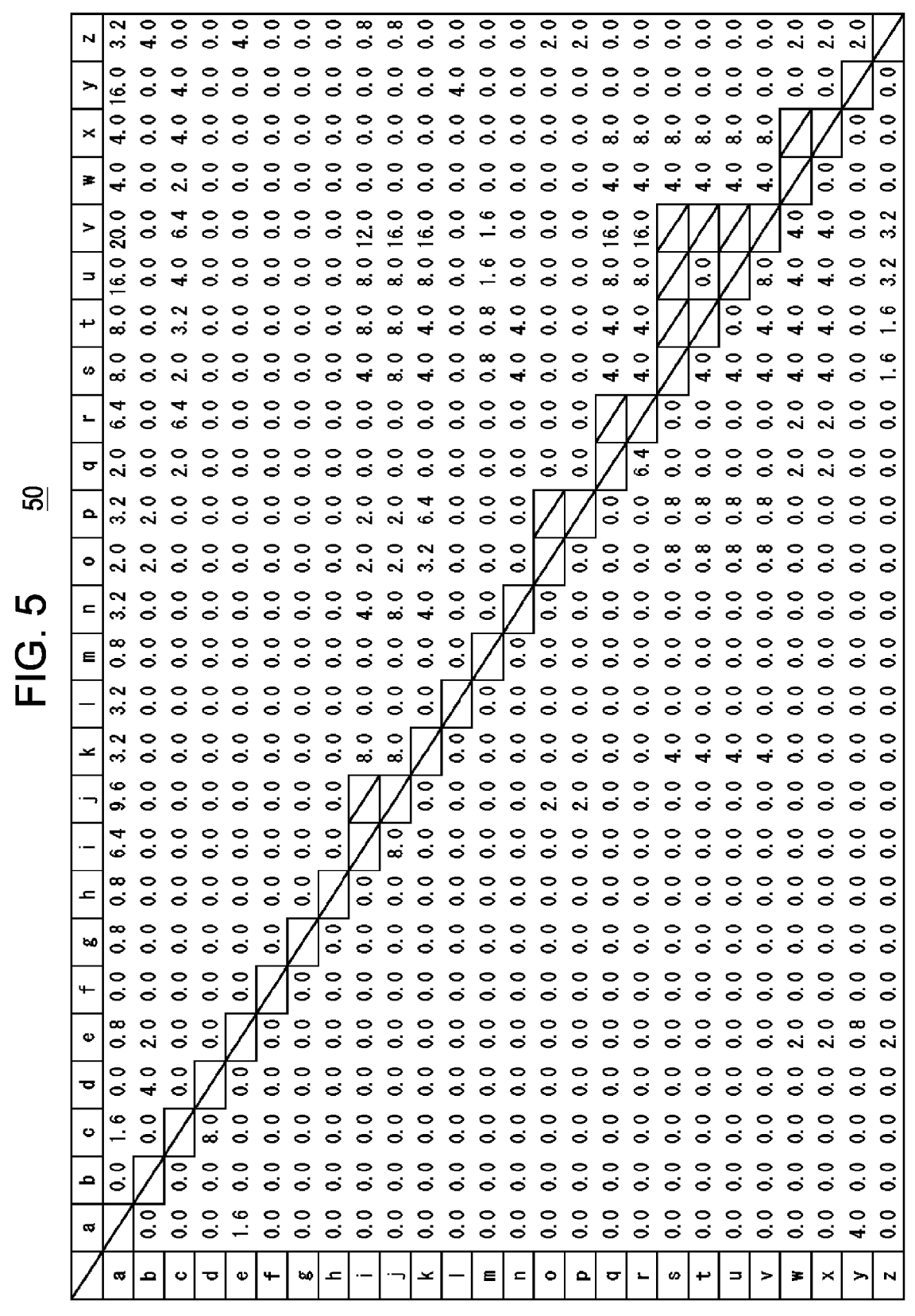

When receiving the probability data 20, the processing time data 30, and optionally, the order constraint data 40 as described above, the input component 100 generates the expected value data 50 on the basis of the probability data 20 and the processing time data 30, and stores the generated data in the memory device 110. FIG. 5 shows an example of the expected value data 50 that is stored in the memory device 110 in this way.

FIG. 5 shows an example of a data structure of the expected value data 50 of this embodiment. An expected value of time required to carry out a modification calculated with the input component 100 is the product of the received probability and processing time, for each combination of processes. FIG. 5 shows a numeral value of the product of the probability and the required time. Further, identifiers of processes performed previously are arranged in the row direction, and identifiers of processes performed subsequently are arranged in the column direction in a table format. To given an example thereof, if the process c is performed first, and the process a is performed later, an expected value of required time is 1.6 hours. Herein below, an expected value of time required to carry out a modification for matching a result of the process a to a result of the process b in the case of performing the process b after the process a is represented by t[b] [a] based on a function t. In this example, t[b] [a]=p[b] [a]×w[b][a].

Figure 6:
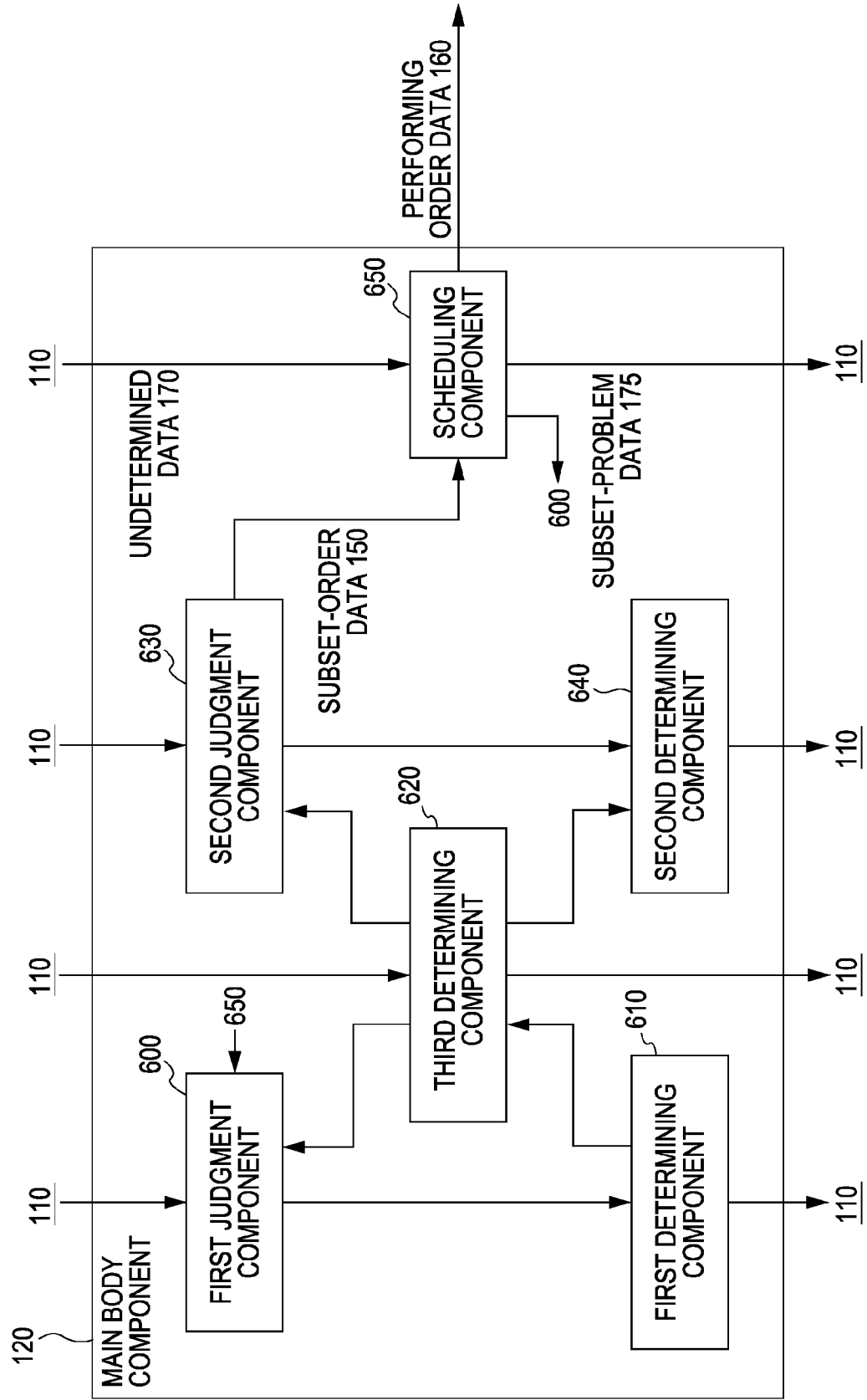
FIG. 6 shows functional configuration of the main body component 120 of this embodiment.

FIG. 6 shows functional configuration of the main body component 120 of this embodiment. The main body component 120 includes a first judging component 600, a first determining component 610, a third determining component 620, a second judging component 630, a second determining component 640, and a scheduling component 650. Each component is implemented by the following CPU 1000 executing programs installed to a computer. The first judging component 600 sequentially selects processes that have not been determined to be performed before or after the other processes. The selected process is referred to as "the primary process". Then, the first judging component 600 judges whether the primary process satisfies any of the preset first condition or second condition.

The first condition is that time required to carry out a modification when a secondary process is performed after the primary process is "shorter" than time required to carry out a modification when the secondary process is performed before the primary process for each combination of processes in the plurality of processes in which a primary process can be carried out before a secondary process. The condition of being "shorter" may be a condition of being "not longer". That is, it is possible to determine that the first condition is satisfied when time required to carry out a modification when the primary process is performed before the secondary process is equal to or shorter than that for a modification carried out when the secondary process is performed before the primary process, for any one of the secondary processes. If the condition is determined satisfied in such a case that the required time is equal, the first condition can be satisfied more easily, so a search space for the optimum performing order of processes can be further narrowed.

Further, the second condition is that an expected value of time required to carry out a modification when a primary process is performed after any of secondary processes is "shorter" than an expected value of time required to carry out a modification when the primary process is performed before any of the secondary processes. The condition of being "shorter" may be a condition of being "not longer". That is, it is possible to determine that the second condition is satisfied when time required to carry out a modification when the secondary processes are performed before the primary process is equal to or shorter than that for a modification carried out when the primary process is performed before the secondary processes. If the condition is determined satisfied in such a case that the required time is equal, the second condition can be satisfied more easily, so a search space for the optimum performing order of processes can be further narrowed. The determination as to whether or not the first and second conditions are satisfied is made based on an expected value of required time for each combination of processes read from the memory device 110.

Then, the first determining component 610 determines that the primary process is performed before the secondary process each time it is judged that the first condition is satisfied. Further, the first determining component 610 determines that the primary process is performed after each of the secondary processes each time it is judged that the second condition is satisfied. The determined order is stored in the memory device 110. Determining that a process b is performed after a process a to store the determination result in the memory device 110 is expressed by doBefore[a][b]=1 and doBefore[b][a]=−1 in the following description. Incidentally, doBefore is a function, a return value of which is 1 when a process of a second argument is performed after a process of a first argument, a return value of which is −1 when the processes are performed in a reverse order thereof, and a return value of which is 0 when a performing order is not determined.

The first judging component 600 repeatedly judges whether or not the first condition and second condition are satisfied for all the primary processes and determines a performing order by the first determining component 610 or second determining component 640 until no p.

The third determining component 620 determines a new performing order based on a transition rule after a new order is determined by at least one of the first determining component 610 and the second determining component 640 as described below. To be specific, if it is determined to perform the primary process and the secondary process in this order, the third determining component 620 determines that a third process that has been determined to be performed before the primary process is performed before the secondary process. Further, the third determining component 620 determines that a fourth process that has been determined to be performed after the secondary process is performed after the primary process.

The second judging component 630 successively selects combinations of processes, a performing order of which has not been determined. The selected combinations of processes are referred to as primary process and secondary process. Then, the second judging component 630 determines a set C of processes that can be performed after the primary process and before the secondary process. The set C is determined on the basis of the order constraint data 40 and the performing order (that is, a value of doBefore) that has been already determined by the first determining component 610 or the second determining component 640 and stored in the memory device 110. Then, the second judging component 630 judges whether or not a third condition that an expected value of time required to carry out a design change "can be more reduced" in a case of performing the primary process, each process in any subset of the set C, and the secondary process in this order, than in a case of performing the secondary process, each process in the subset, and the primary process in this order, is satisfied. This judgment is made on the basis of each expected value of required time read from the memory device 110. Incidentally, the condition that the required time "can be more reduced" may be a condition of "not increasing" the time. That is, it is possible to determine that the third condition is satisfied when time required to carry out a design change in the case of performing the primary process, each process in the subset, and the secondary process is equal to or shorter than that for design change in the case of performing the secondary process, each process in the subset, and the primary process. If the condition is determined satisfied in such a case that the required time is equal, the third condition can be satisfied more easily, so a search space for the optimum performing order of processes can be further narrowed.

The second determining component 640 determines to perform the primary process before the secondary process each time it is judged that the third condition is satisfied. The second judging component 630 repeatedly judges whether or not the third condition is satisfied, for all combinations of primary process and secondary process.

A performed order that has been determined at the time when none of the first to third conditions are satisfied is read from the memory device 110 and output from the second judging component 630 to the scheduling component 650. Data about the performing order is referred to as "sub-order data 150".

Next, the scheduling component 650 determines a performing order of processes in an undetermined set including processes, a performing order of which has not been determined within a range of the order constraint of the order constraint data 40 and the performing order determined by first determining component 610, the second determining component 640, and the third determining component 620, and outputs the performing order determined. The performing order may be determined by, for example, exhaustive search, dynamic programming, or local search. The exhaustive search means calculating the total sum of the times required to carry out a modification for every possible performing order of processes, and select the performing order that minimizes the total sum. The exhaustive search or the like could not be completed within a practical period if the number of processes is too large. However, the number of undetermined processes can be reduced enough by the first determining component 610 and the second determining component 640 to narrow a search space, so the search may be completed within a practical period.

To give another method thereof, the scheduling component 650 may determine a performing order of undetermined processes in the following manner. The scheduling component 650 first reads undetermined data 170 representing an undetermined set from the determination system 10. Then, the scheduling component 650 recursively uses the first determining component 610 and second determining component 640 to determine a performing order of processes in the undetermined set on assumption that each of the processes in the undetermined set is performed first in the undetermined set. This is realized by, for example, defining a problem of determining a performing order of processes in the undetermined set as a sub-problem, storing sub-problem data 175 representing the sub-problem in the memory device 110, and instructing the first judging component 600 to start performing the procedure.

The undetermined set is a set of processes, a performing order of which has not been determined by the first determining component 610 and the second determining component 640, so the first determining component 610 and the second determining component 640 cannot determine how the optimum order is attained by performing which process first in the undetermined set. However, if a process to be performed first in the undetermined set is assumed, a performing order of the remaining processes can be determined by the first determining component 610 and the second determining component 640 in some cases. The scheduling component 650 determines optimum performing orders on assumption that each of the plurality of processes in the undetermined set is performed first. Then, the scheduling component 650 selects a performing order that minimizes the time required to carry out a modification from the optimal performing orders, and outputs the selected one as the performing order data 160.

Referring to FIGS. 7 to 19, processes for determining a performing order are described in more detail below.

Figure 7:
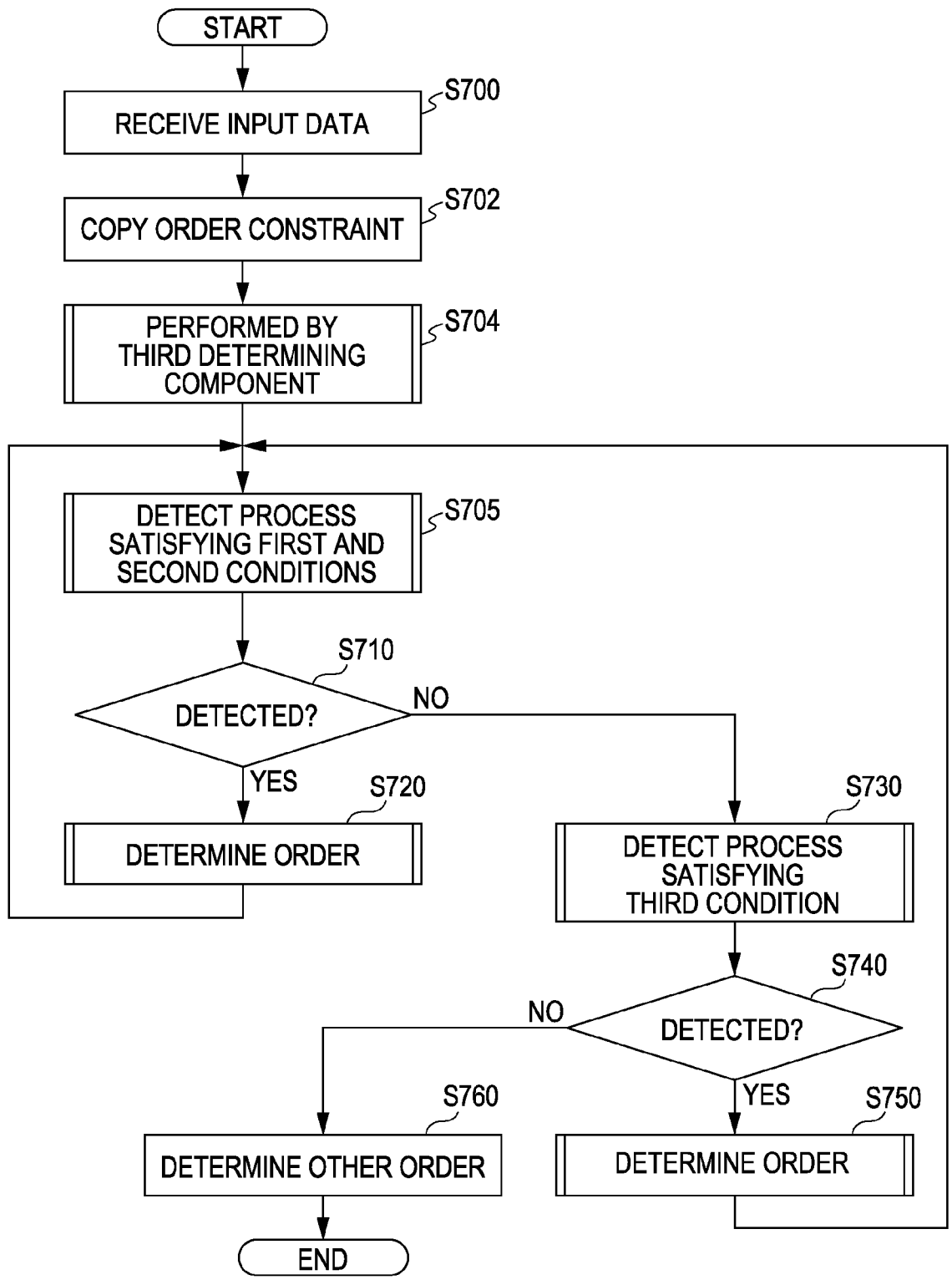
FIG. 7 is a flowchart schematically showing a processing stage of the determination step 10 of this embodiment.

FIG. 7 is a flowchart schematically showing a processing stage of the determination step 10 of this embodiment. The input component 100 receives the input probability data 20, processing time data 30, and order constraint data 40 (S700). If data about processes necessary for designing a product has been not yet input, the input component 100 additionally receives such data. The input component 100 calculates the expected value data 50 based on the probability data 20 and the processing time data 30, and stores the calculated value together with the order constraint data 40 in the memory device 110. In addition, the input component 100 may set aside an area for storing a determined performing order in the memory device 110.

Then, if receiving the order constraint data 40, the input component 100 performs the following processes of S702 and S704. First, the input component 100 copies an order constraint defined by the order constraint data 40 to an area for storing a determined performing order, as a determined performing order (S702). With this first step, it is unnecessary to separately consider the order constraint in subsequent processes. Then, the input component 100 causes the third determining component to process each order constraint (S704). To be specific, the input component 100 sets a primary process prescribed to be performed first by the order constraint as a first argument and sets a secondary process prescribed to be performed later by the order constraint as a second argument, and then performs the process of the third determining component 620 as for each order constraint. As a result, the third determining component 620 determines that a third process prescribed to be performed before the primary process by the other order constraint is performed before the secondary process, and determines that a fourth process prescribed to be performed after the secondary process by the other order constraint is performed after the primary process. As a result, no contradiction arises between an order determined later and the order constraint.

Next, the first judging component 600 detects a process that satisfies the first condition or the second condition (S705). Under the condition that the process is detected (S710: YES), the first determining component 610 determines a performing order of the primary process and the secondary processes (S720). After that, the determination system 10 returns to the process in S705, and further judges whether or not the other process satisfies the first condition or the second condition. On the other hand, under the condition that no process that satisfies the first condition or the second condition is detected (S710: NO), the second judging component 630 detects a process that satisfies the third condition (S730). Under the condition that the process is detected (S740: YES), the second determining component 640 determines a performing order of the primary process and the secondary process (S750).

After that, the determination system 10 returns to the process of S705. As a result, the first judging component 600 judges, after the second determining component 640 determines a performing order, whether the first or second condition is satisfied on the basis of the determination. On the other hand, if no process that satisfies the third condition is detected (S740: NO), since a process that satisfies the first condition or the second condition is not detected either, the scheduling component 65 determines a performing order of the other processes, a performing order of which has not been determined, by another method (S760).

FIG. 8 is a detailed flowchart of the process in S705. First, the first judging component 600 decides a set of all processes necessary for product design as C (S800). Next, the first judging component 600 judges whether or not the set C is an empty set (S810). If the set is judged an empty set (S810: YES), the first judging component 600 judges that a process that satisfies the first condition or the second condition is not detected (S860). On the other hand, if the set is judged not an empty set (S810: NO), the first judging component 600 extracts one process from the set C. Extracting the process means to select a process from the set C and remove the selected process from the set C. Such a change of the set can be performed by storing identifiers of each process in the set in a RAM 1020 or other such memories, and accessing the RAM 1020 to read/write data. The change of the set or similar operations would be obvious to those skilled in the art, so detailed description thereof is omitted here.

A process selected in S820 is referred to as "process a". The process a is a candidate for the primary process of the present invention. Subsequently, the first judging component 600 judges whether or not the process satisfies the first condition or the second condition (S830). Under the condition that neither condition is satisfied (S840: NO), the first judging component 600 returns to the process in S810, and repeatedly performs a process of successively judging whether or not the first condition or the second condition is satisfied, for all the primary processes that satisfy the first condition or the second condition. On the other hand, under the condition that the first condition or the second condition is satisfied (S840: YES), the first judging component 600 judges that a process that satisfies the first condition or the second condition is detected, and outputs "1" if the first condition is satisfied and outputs "−1" if the second condition is satisfied to the first determining component 610 (S850).

Figure 9A:
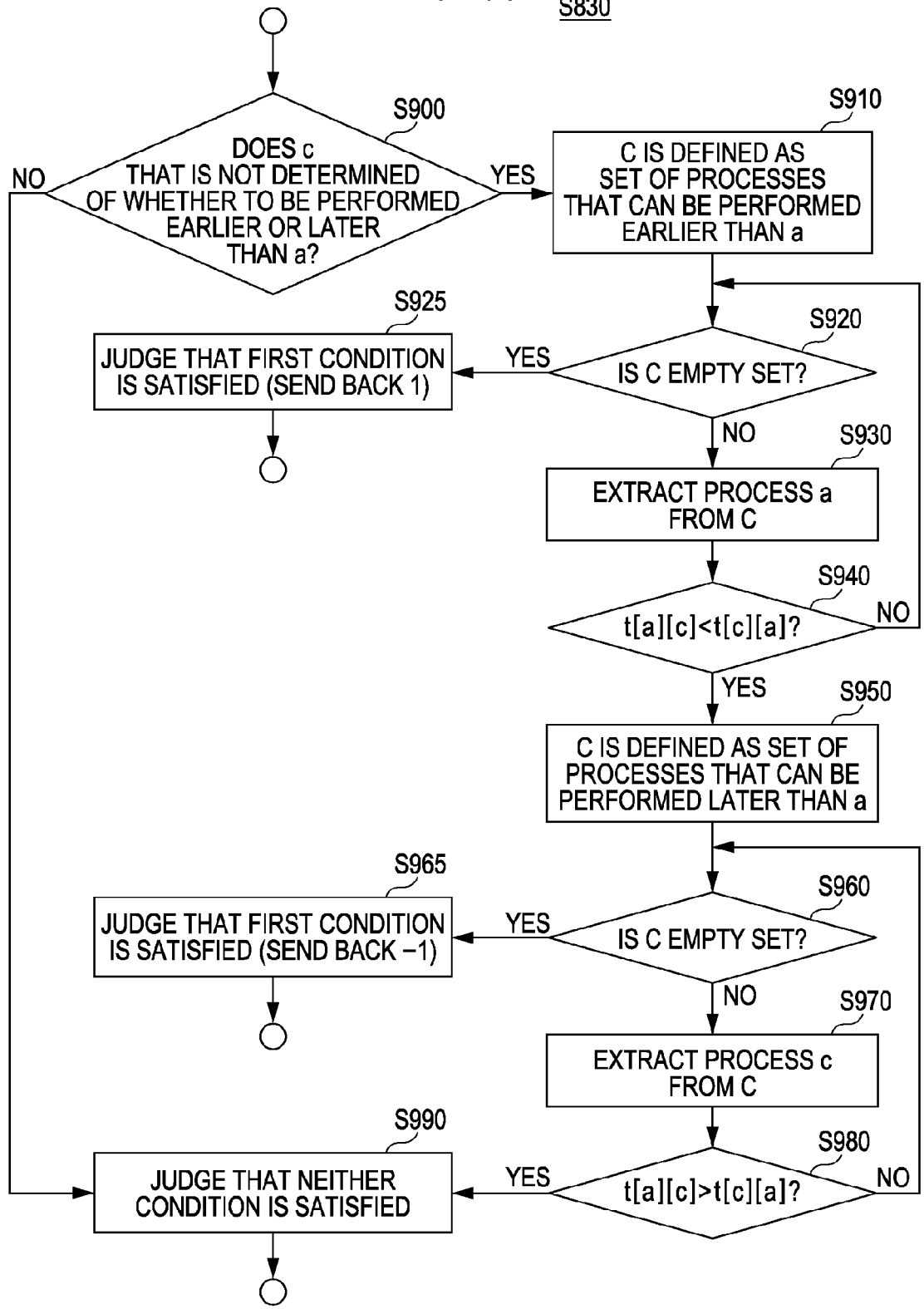
FIG. 9a is a detailed flowchart of the process in S830.

FIG. 9a is a detailed flowchart of the process in S830. The first judging component 600 judges whether or not there are the other processes c that have not been determined to be performed before or after the process a selected as a candidate for the primary process (S900). This judgment is expressed by numerical expressions as follows: "is there c that satisfies a≠c and doBefore[a][c]=0?". As an example of the judgment methods, the first judging component 600 may access determined orders stored in the memory device 110 in order to determine processes that are not determined to be performed before and after the process a. If such a process c is not detected (S900: NO), the first judging component 600 judges that the process a satisfies neither the first condition nor the second condition (S990).

If such a process c is detected (S900: YES), the first judging component 600 decides a set of processes that can be performed before the process a as C (S910). The set of processes that can be performed before the process a means a set of processes that could be performed before the process a in accordance with the order constraint defined by the order constraint data 40 and a performing order that has been already determined by any of the first determining component 610, the third determining component 620, and the second determining component 640. This set C is expressed by numerical expressions as a set of processes c that satisfy c≠a and doBefore[c][a]≠1.

Next, the first judging component 600 determines whether or not the process C is an empty set (S920). If the set C is an empty set (S920: YES), the first judging component 600 judges the process that satisfies the first condition and outputs "1" (S925). If the set C is not an empty set (S920: NO), the first judging component 600 extracts a process from the set C and decides the process as a process c (S930). The process c is an example of the process that can be performed after the process a, that is, secondary process. Next, the first judging component 600 judges whether or not time required to carry out a modification in the case of performing the process a before the process c is not longer than that in the case of performing the process a after the process c (S940). This judgment is expressed by numerical expressions as follows: "is t[a][c]<t[c][a] satisfied?".

If required time is not longer (S940: NO), the first judging component 600 returns to the process of S900, and judges whether or not the other processes in the set C satisfy the condition of required time. If the required time is longer (S940: YES), the first judging component 600 determines that the process a does not satisfy the first condition, and subsequently decides a set of processes that can be performed after the process a as C to judge whether or not the second condition is satisfied (S950). The processes that can be performed after the process a are determined depending on whether or not the processes could be performed after the process a in accordance with the order constraint defined by the order constraint data 40 and the determined performing order similar to the determination as to processes that can be performed before the process a.

Next, the first judging component 600 judges whether or not the set C is an empty set (S960). If the set C is an empty set (S960: YES), the first judging component 600 judges that the process a satisfies the second condition and outputs "−1" (S965). On the other hand, if the set C is not an empty set (S960: NO), the first judging component 600 extracts one process from the set C and decides the process as a process c (S970). Next, the first judging component 600 judges whether or not time required to carry out a modification in the case of performing the process a after the process c is longer than that in the case of performing the process a before the process c (S980). This judgment is expressed by numerical expressions as follows: "t[a][c]>t[c][a]?".

If the required time is longer (S980: YES), the first judging component 600 judges that neither the first condition nor the second condition is satisfied (S990). If the required time is not longer (S980: NO), the first judging component 600 returns to the process in S960, and judges whether or not the other processes in the set C satisfy the condition of required time.

Through the above processes, the first judging component 600 can determine whether or not a certain process that satisfies the first condition or the second condition, and if satisfied, which condition is satisfied.

Figure 9B:
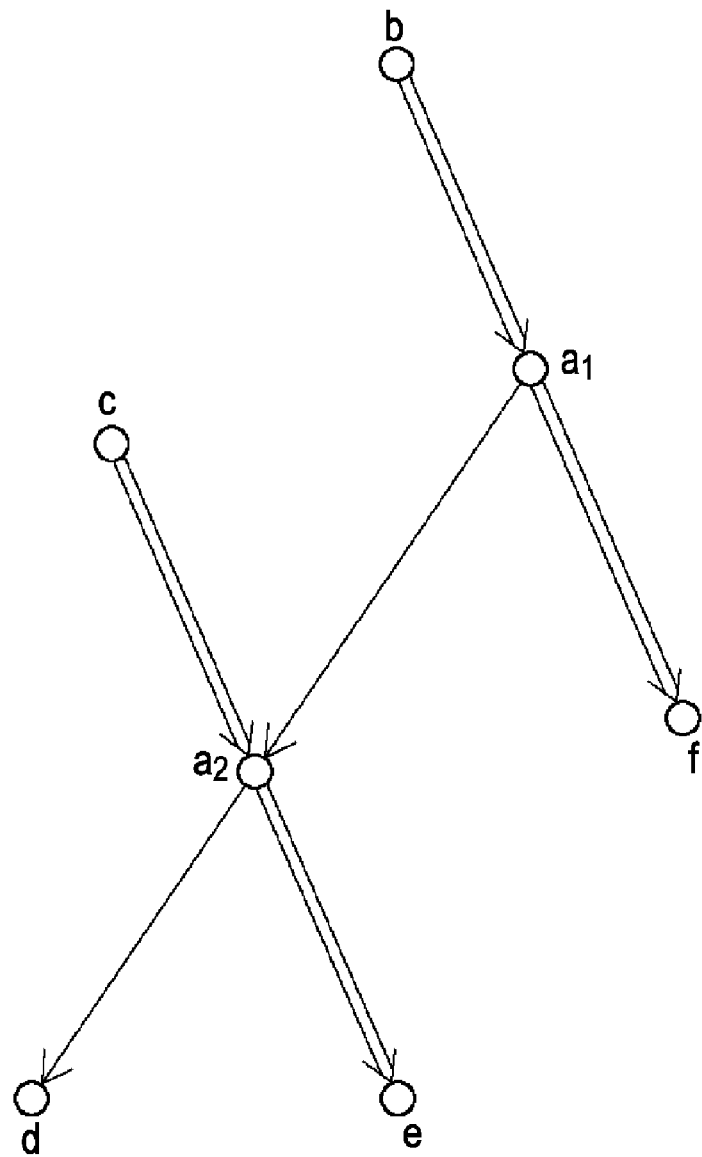
FIG. 9b is a conceptual view of how to determine whether or not the first condition is satisfied.

FIG. 9b is a conceptual view of how to determine whether or not the first condition is satisfied. In FIG. 9b, each process is schematically illustrated as a node, and the determined performing order or order constraint is indicated by an edge of a double-lined arrow. Further, a performing order that can more reduce an expected value of modification time than a reverse order thereof, although not determined, is indicated by an edge of a single-lined arrow. Further, in FIG. 9b, if processes are performed in order from the upper process to the lower process, an expected value of time required to carry out a modification can be more reduced than in a reverse order thereof unless otherwise specified. Further, for ease of illustration, a performing order of a combination of processes not connected by the edge is not considered here.

A node $a_1$ has been determined to be performed after a node b and before a node f. A performing order of the node $a_1$ and a node $a_2$ is not determined, but if the node $a_1$ is performed before the node $a_2$, an expected value for a modification can be more reduced. In such cases, the node $a_1$ satisfies the first condition. This is because an expected value for a modification can be more reduced in the case of performing the node $a_1$ before all nodes (that is, in this example, the node f and the node $a_2$) but the node b that has been determined to be performed before the node $a_1$.

On the other hand, the node $a_2$ has been determined to be performed after a node c and before a node e. A performing order of the node $a_1$ and a node d has not been determined, but an expected value for a modification can be more reduced in the case of performing the node $a_2$ before the node d. However, an expected value for a modification is not reduced if the node $a_2$ is performed before the node $a_2$, a performing order of which has not been determined. Hence, the node $a_2$ does not satisfy the first condition. Here, after the node $a_1$ is determined to be performed before the node $a_2$, nodes that can be performed after the node $a_2$ are only node d and the node e, so the node $a_2$ satisfies the first condition.

In this way, the first judging component 600 determines a performing order of the process $a_1$ and the process $a_2$. In an actual condition that the number of processes is large, the first judging component 600 determines a performing order of processes in order from a process to be performed first. Further, the same applies to the second condition. That is, the first judging component 600 determines a performing order of processes in order from a process to be performed later based on whether or not the second condition is satisfied.

FIG. 10 is a detailed flowchart of the process in S720. Under the condition that a process that satisfies the first condition or the second condition is detected, the first determining component 610 decides a set of processes that have not determined to be performed before and after the process a that satisfies the condition as B (S1000). The first determining component 610 judges whether or not the set B is an empty set (S1010). If the set B is an empty set (S1010: YES), the first determining component 610 determines that the first condition or the second condition is satisfied and completes determination of a performing order. If the set B is not an empty set (S1010: NO), the first determining component 610 extracts one process from the set B and decides the process as a process b (S1020).

Next, the first determining component 610 determines that the process a is performed before the process b if the process a satisfies the first condition (S1030). If the process a satisfies the second condition, the first determining component 610 determines that the process a is performed after the process b. These determination processes are collectively expressed as follows: doBefore[a][b]=(return value) and doBefore[b][a]=−(return value). The term (return value) refers to a value output from the first judging component 600. The origin of the "return value" is as follows: when the first judging component 600 is realized as a function in the specifications of program language, an output value of the first judging component 600 is expressed as a return value of the function.

Next, the first determining component 610 judges whether the return value is "1" or "−1" (S1040). If the return value is "1" (S1040: 1), the first determining component 610 sets the order of the process a and the process b as an argument, and allows the third determining component 620 to perform a process of determining a performing order (S1050). The origin of the argument is similar to the return value. That is, when the third determining component 620 is realized as a function in the specifications of program language, an input parameter to the function is expressed by an argument to the function. On the other hand, if the return value is "−1" (S1040: −1), the first determining component 610 sets the order of the process b and the process a as an argument, and allows the third determining component 620 to perform a process of determining a performing order (S1060).

Figure 11A:
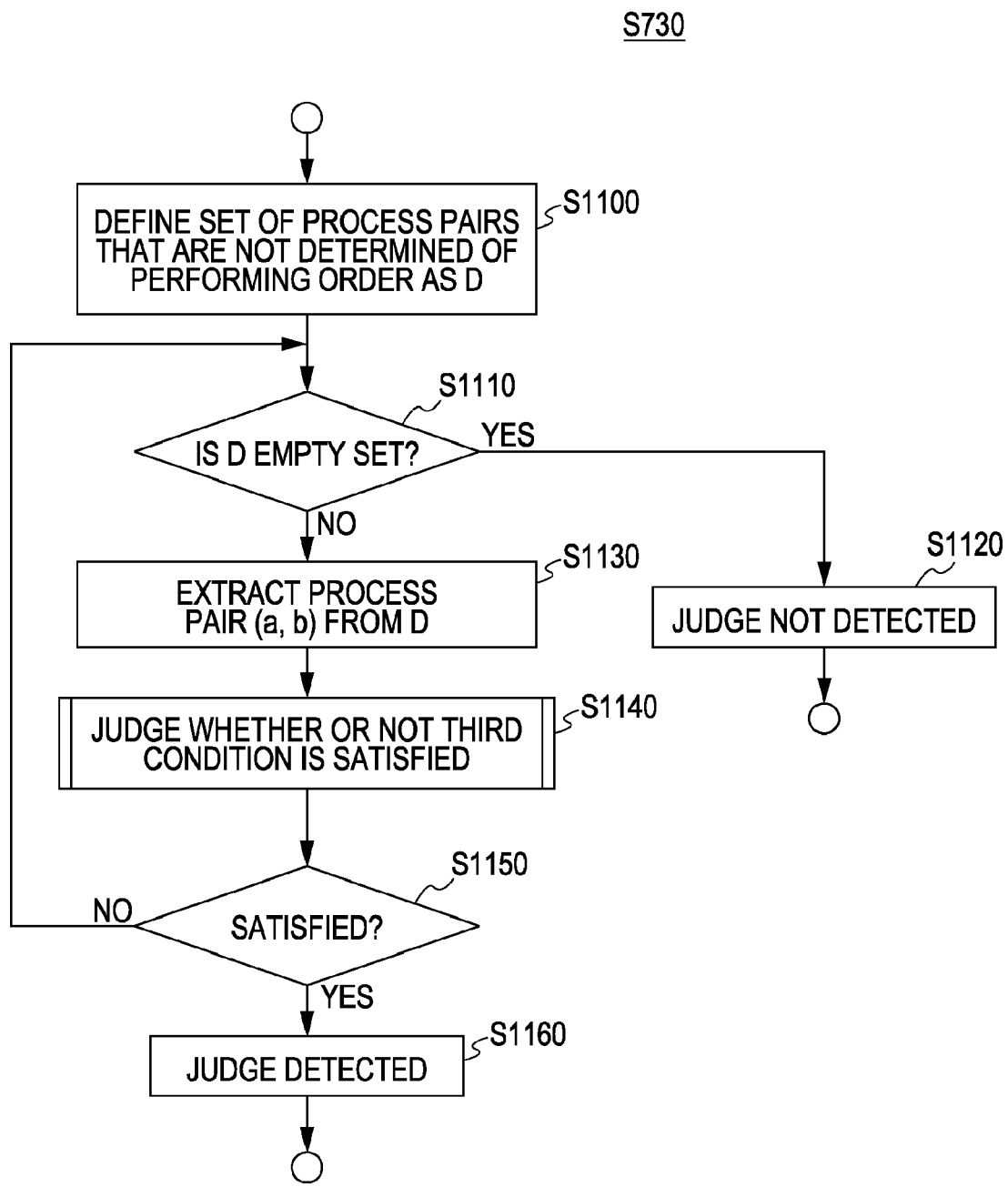
FIG. 11a is a detailed flowchart of the process in S730.

FIG. 11a is a detailed flowchart of the process in S730. The second judging component 630 first decides a set of processes, a performing order of which has not been determined, as D (S1100). Then, the second judging component 630 judges whether or not the set D is an empty set (S1100). If the set D is an empty set (S1110: YES), the second judging component 630 judges that no set of processes that satisfy the third condition is detected (S1120), and terminates the process. On the other hand, if the set D is not an empty set (S1110: NO), the second judging component 630 extracts a pair of processes from the set D and decides the processes as a process a and a process b (S1130). The process a is the primary process of the present invention, and the process b is the secondary process of the present invention.

Next, the second judging component 630 determines whether or not the pair of the process a and the process b satisfies the third condition (S1140). The third condition is that that an expected value of time required to carry out a design change is not increased in a case of performing the process a, each process in any subset of the set C including processes that can be performed after the process a and before the process b, or after the process b and before the process a, and the secondary process in this order, as compared to performing the secondary process, each process in the subset, and the primary process in order. If the third condition is not satisfied (S1150: NO), the second judging component 630 returns to the process in S1110, and repeatedly performs a judgment process in sequence, for all the combinations of the primary process and secondary process, which satisfy the third condition. If the third condition is satisfied (S1150: YES), the second judging component 630 judges that a process that satisfies the third condition is detected (S1160), and completes the process.

Figure 11B:
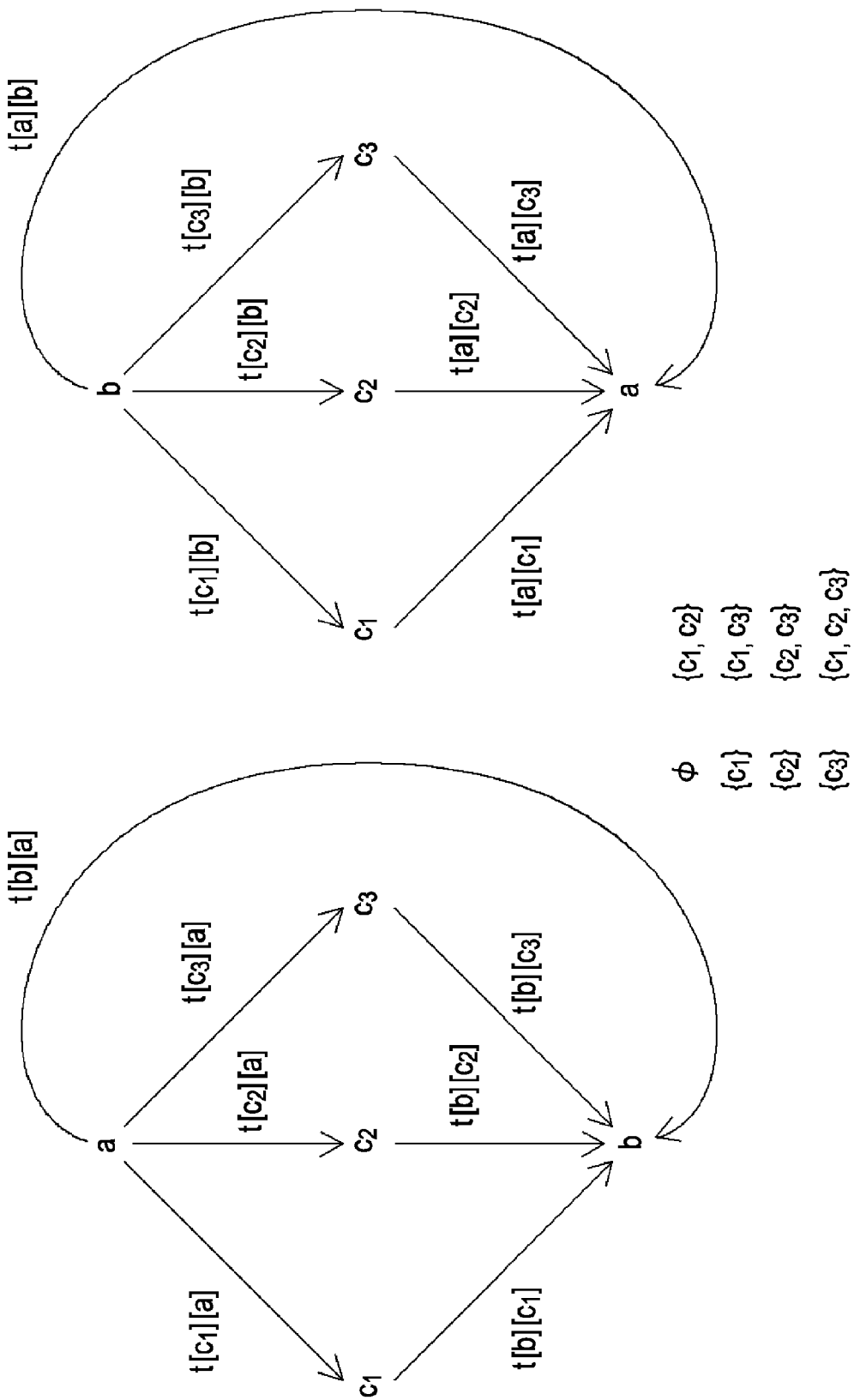
FIG. 11b is a conceptual view of how to determine whether or not the third condition is satisfied.

FIG. 11b is a conceptual view of how to determine whether or not the third condition is satisfied. A set C of processes that can be performed after the process a and the before the process b or processes that can be performed after the process b and before the process a includes a process c1, a process c2, and a process c3 at this point. With this step, a set of processes that can be performed after the process a and before the process b, or after the process b and before the process a corresponds to all subsets of the set C, that is, any one of an empty setφ, {c1}, {c2}, {c3}, {c1, c2}, {c1, c3}, {c2, c3}, and, {c1, c2, c3}.

An idea for judging whether or not the third condition is satisfied in this example is described here. First, whether the process a is performed before or after the process b should be determined in accordance with not only a modification based on a relationship between the process a and the process b but a modification based on a relationship between processes belonging to subsets of the set C, which can be performed there between, and the processes a and b. If the judgment is made on the basis of the relationship between the process a and process b, the criterion for judgment is whether or not time required to carry out a modification can be more reduced in the case of performing the process a before the process b than in the case of performing the process a after the process b. The term "can be reduced" can be expressed by the following expression: $t[b][a]<t[a][b]$, and reduced time can be expressed by the following expression: $t[a][b]-t[b][a]$.

Then, the processes c in the set C are performed in the order of processes a, c, and b to thereby calculate an increment in time required to carry out a modification as compared to the order of processes b, c, and a, and determine whether or not the total sum of increments is equal to or smaller than the reduced time in every processes c in any subset of the set C. For example, an expected value of required time, which is increased by performing the processes a, c1, and b in this order, with respect to the process c1 can be expressed by the following numerical expression: $t[c1][a]+t[b][c1]-t[c1][b]-t[a][c1]$. On condition that this calculation is performed on processes of each subset in the set C, the calculation results thereof are summed, so the total sum of increments in required time in each subset can be calculated.

Figure 12A:
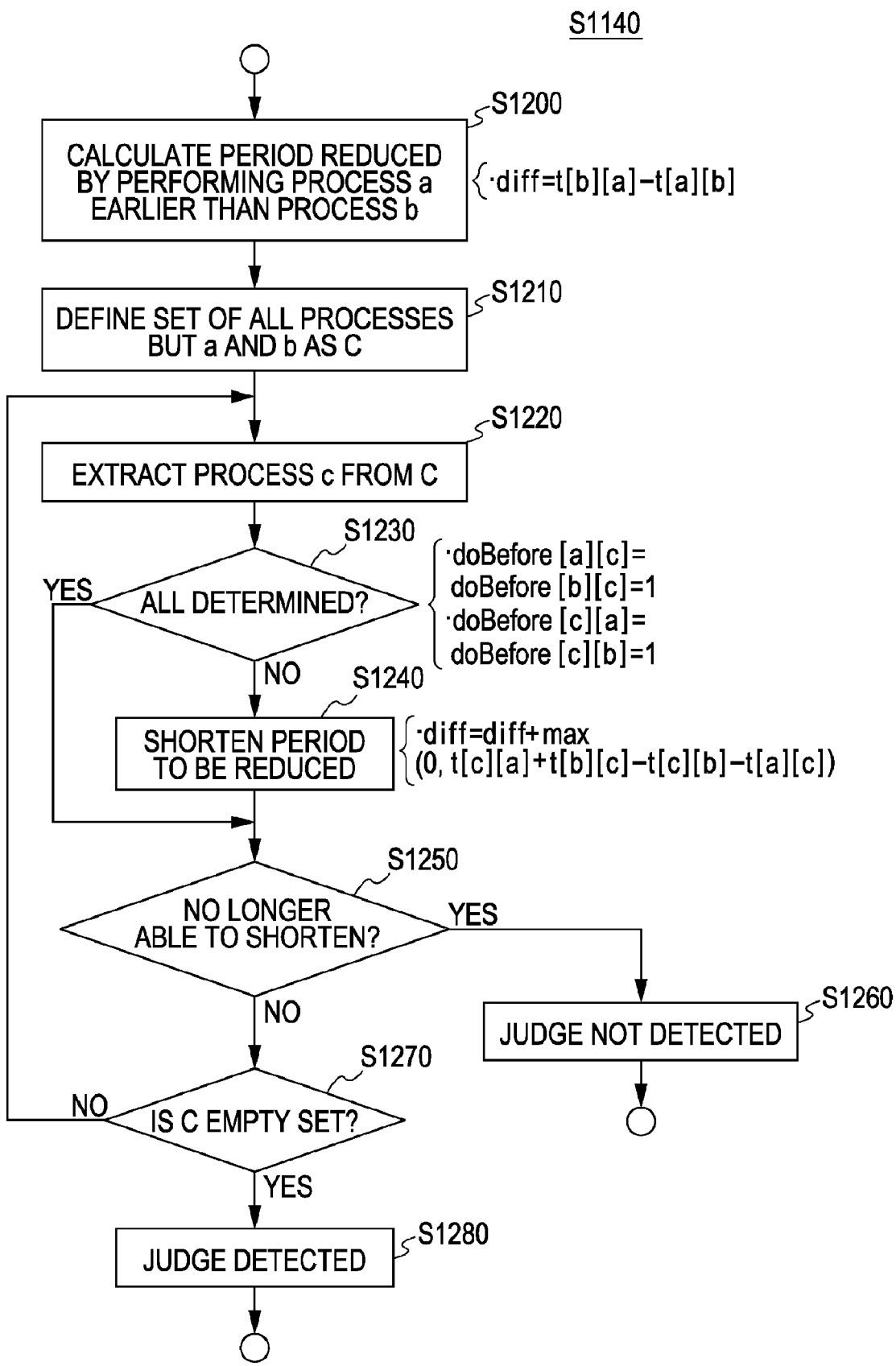
FIG. 12a is a detailed flowchart of the process in S1140.

Whether or not to perform the process a before the process b can be determined by comparing the total sum of reduced time and the total sum of increments in required time with respect to all subsets. However, in the case where the set C includes many subsets, calculation cannot be completed within a short period simply by implementing the above idea on the computer. Referring to FIG. 12a, a method of appropriately and efficiency determining whether or not the third condition is satisfied while omitting a determination process for most of the subsets is described below.

FIG. 12a is a detailed flowchart of the process in S1140. First, the second judging component 630 calculates an expected value of time required to carry out a design change, which can be reduced by performing the process a before the process b compared to performing the process b before the process a (S1200). This calculation is expressed by the following numerical expression: diff=t[b][a]-t[a][b]. As apparent from the expression, if the calculated value is a negative value, the required time can be reduced by an absolute value thereof; if the calculated value is a positive one, the required time is increased by an absolute value thereof.

Next, the second judging component 630 decides a set of all processes but the processes a and b as C (S1210). Then, the second judging component 630 extracts one process from the set C and decides the process as the process c (S1220). Next, the second judging component 630 determines whether the process c is determined to be performed after the process a or b or before the process a or b (S1230). If the determination result is positive, the process c cannot be performed after one of the processes a and b nor before the other process. Therefore, if the determination result is positive (S1230: YES), the second judging component 630 advances to a process in S1250 and makes determination as to the next process.

On the other hand, if the determination result is negative (S1230: NO), the second judging component 630 calculates an increment only in the case where an expected value of time required to carry out a design change is increased by performing the process c after the process a and before the process b compared to the case of performing the process c after the process b and before the process a, and subtracts the increment from the reduced time calculated in S1200 (S1240). The increment is expressed by the following numerical expression: t[c][a]+t[b][c]-t[c][b]-t[a][c]. Further, a process of subtracting the increment from the reduced expected value of required time is expressed by the following numerical expression: diff=diff+max(0, t[c][a]+t[b][c]-t[c][b]-t[a][c]).

As a result, in the case where an expected value of time required to carry out a modification is increased even by performing the process a before the process b (S1250: YES), the second judging component 630 determines that no set of processes that satisfy the third condition is detected (S1260), and terminates the process. This judgment is expressed by the numerical expression: "diff>0?". On the other hand, if an expected value of required time is not increased by performing the process a before the process b (S1250: NO), the second judging component 630 subsequently judges whether or not the set C is an empty set (S1270). If the set C is not an empty set (S1270: NO), the second judging component 630 returns to the process in S1220, and starts determination as to the other processes in the set C. On the other hand, if the set C is an empty set (S1270: YES), the second judging component 630 judges that a set of processes that satisfy the third condition is detected (S1280).

As described above with reference to FIG. 12a, the second judging component 630 can calculate increments in expected value of time required to carry out a design change in each process that increases the expected value by being performed after the process a and before the process b as compared to performed after the process b and before the process a. Then, the second judging component 630 determines that the third condition is satisfied when an expected value of time required to carry out a design change which can be reduced by performing the process a before the process b is not smaller than the total sum of increments in the expected value. With this step, determination is directed only to a subset that maximizes time required to carry out a modification by being performed after the process a and before the process b instead of performing determination on all subsets in the set C, and processing time necessary for calculation of the required time can be saved.

Figure 12B:
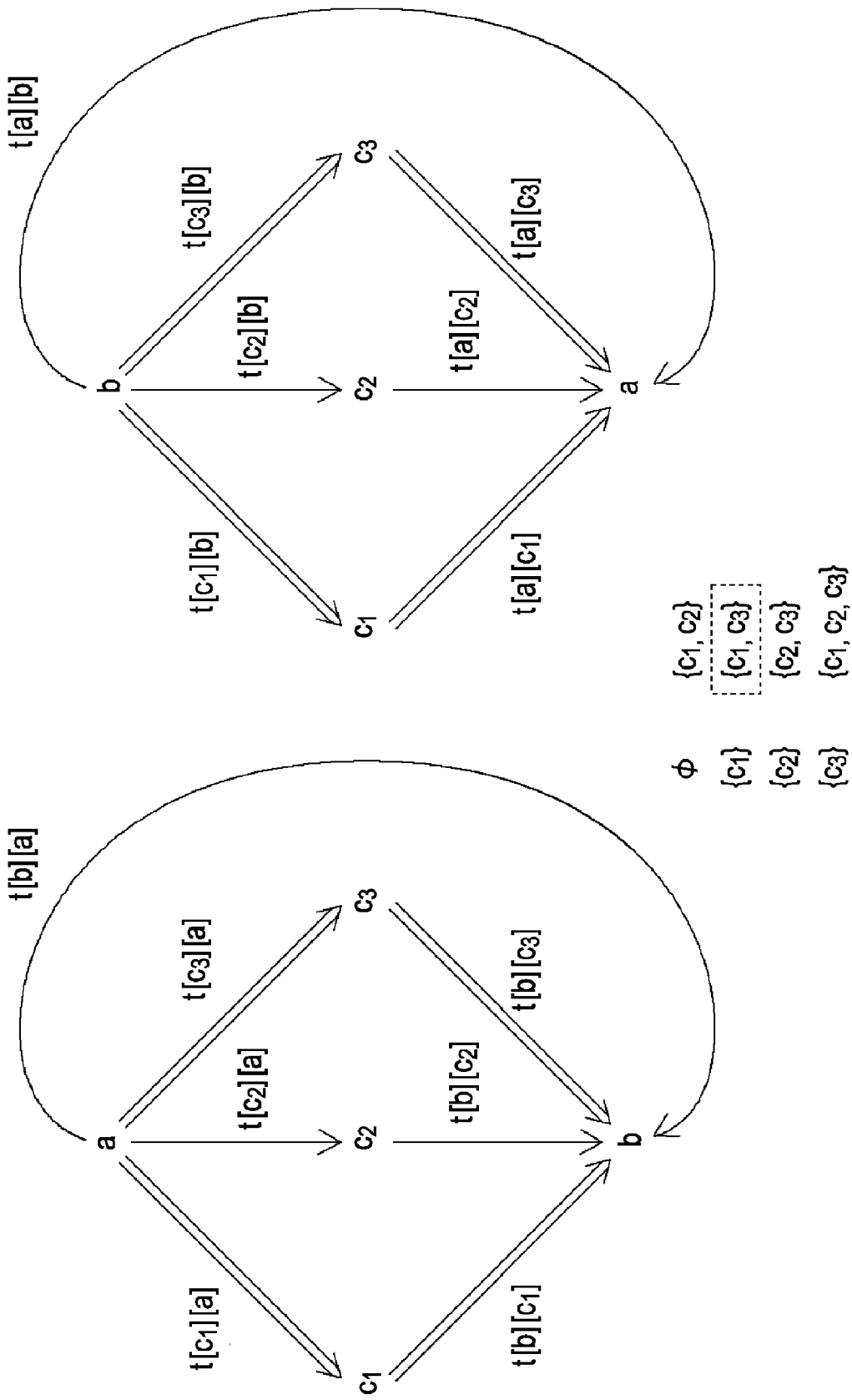
FIG. 12b is a conceptual view of an idea for efficiently determining whether or not the third condition is satisfied.

FIG. 12b is a conceptual view of an idea for efficiently determining whether or not the third condition is satisfied. Processes that increase an expected value of time required to carry out a modification by being performed after the process a and before the process b as compared to performed in a reverse order thereof are defined as a process c1 and a process c3. In this case, in the above process in S1240 of FIG. 12a, only an expected value that is increased by performing the process c1 and the process c3 after the process a and before the process b is added to a variable diff. As for the process c2 that ca reduce the required time by being performed after the process a and before the process b, the reduced time is not reflected to the variable diff.

This means that the second judging component 630 performs determination only on a subset {c1, c3} that maximizes time required to carry out a modification by being performed after the process a and before the process b. In this way, a determination target is only one subset although determination has to be originally performed on 8 subsets, so required time for determination can be shortened. An effect of shortening the time is large for the set C of a large size.

Figure 13:
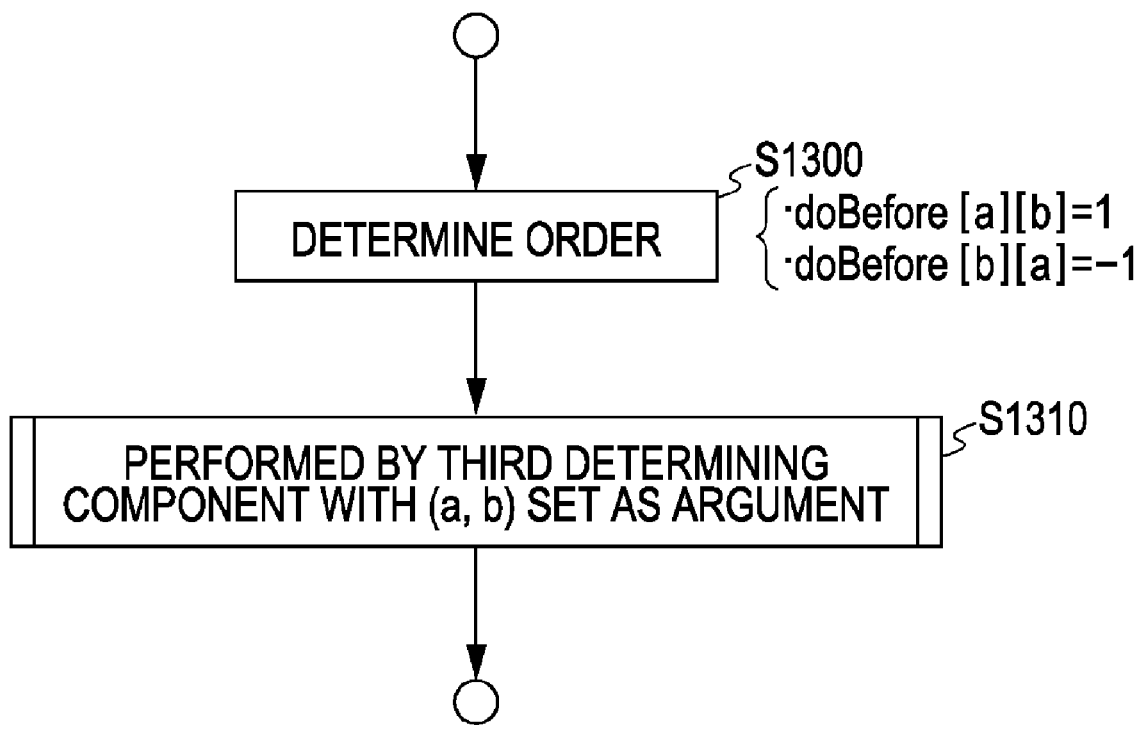
FIG. 13 is a detailed flowchart of the process in S750.

FIG. 13 is a detailed flowchart of the process in S750. If a part of the process a and the process b satisfies the third condition, the second determining component 640 determines that the process a is performed before the process b (S1300). This determination is expressed by the numerical expressions: doBefore[a][b]=1 and doBefore[b][a]=-1. Then, the process a is set as a first argument, and the process b is set as a second argument, a function for realizing the third determining component 620 is called, and the third determining component 620 is instructed to start the procedure (S1310).

FIG. 14 is a detailed flowchart of processes common to S704, S1050, S1060, and S1210. The third determining component 620 decides a set of all processes but the process a as a first argument and the process b as a second argument as C (S1400). Then, the third determining component 620 extracts one process from the set C and sets the process as a process c (S1410). The process c is a candidate for the third process or fourth process of the present invention. Then, the third determining component 620 judges whether or not a performing order of the process c and the process a has not been determined and whether or not the process c has been determined to be performed after the process b (S1420).

If the judgment result is positive (S1420: YES), the third determining component 620 determines that the process c is performed after the process a (S1430). As a result, a performing order of the processes a and c can be determined by applying a transition rule to a performing order of the processes a and b and the other determined performing order. Then, the third determining component 620 recursively applies the processes of this flowchart with the order of the process a and the process c used as a new argument (S1440).

Next, the third determining component 620 determines whether or not a performing order of the process c and the process a has not been determined and whether or not the process c has been determined to be performed before the process a (S1450). If the determination result is positive (S1450: YES), the third determining component 620 determines that the process c is performed before the process b (S1460). Then, the third determining component 620 recursively applies the processes of this flowchart with the order of the process c and process b used with a new argument (S1470).

Subsequently, the third determining component 620 extracts a process c selected in S1410 from the set C (S1480), and determines whether or not the set C is an empty set (S1490). If the set C is an empty set (S1490: YES), the third determining component 620 ends the processes of this flowchart. If the set C is not an empty set (S1490: NO), the third determining component 620 returns to a process in S1410 and performs determination as to the other processes in the set C.

In this way, each time a performing order is determined by the first determining component 610 and the second determining component 640, and the third determining component 620, the third determining component 620 can determine a new performing order by applying a transition order to the performing order and the other determined performing order. Thus, it is possible to prevent such a situation that although a performing order of a certain set of processes can be transiently performed, a subsequent process is performed with the order being not determined, and to prevent a contradiction such as a cycle of processes performed in the performing order.

A flow of the process of determining a performing order of processes is described so far with reference to FIGS. 7 to 14, but symbols in the figures, such as the set C or the processes a, b, and c are effective only in the figures including steps in which the symbols are defined, and thus are irrelevant to similar symbols defined in the other figures unless an argument or return value is demonstrated. That is, these symbols function as local variable/private variable in the case of implementing these processes with a program language. On the other hand, predefined data to be stored in the memory device 110 such as doBefore or t is not changed throughout processes of plural figures. That is, these symbols function as a global variable/public variable in the case of implementing these processes with a program language.

Figure 15A:
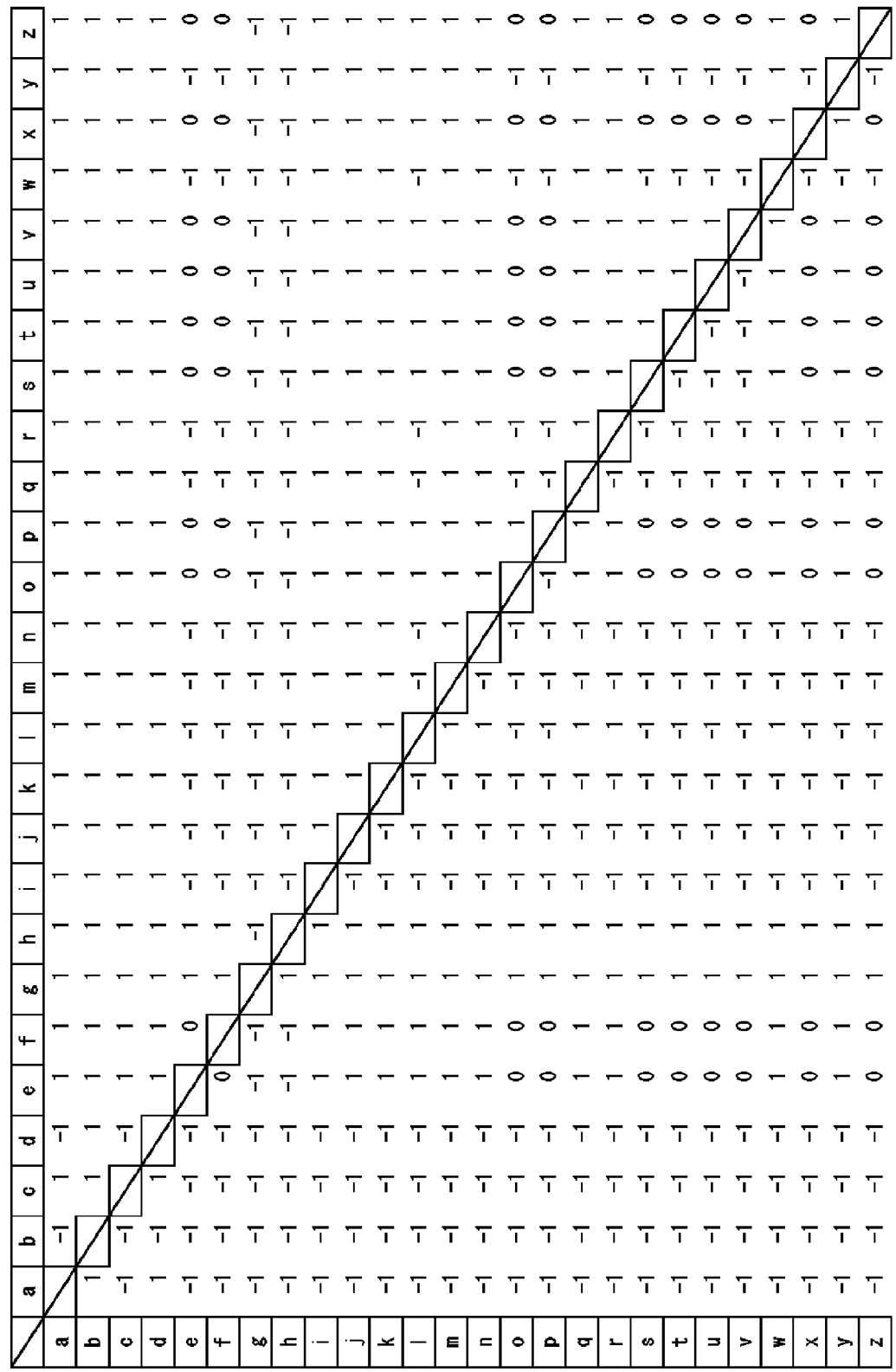
FIG. 15a shows an example of sub-order data 150 generated with the determination system 10 of this embodiment.
Figure 15B:
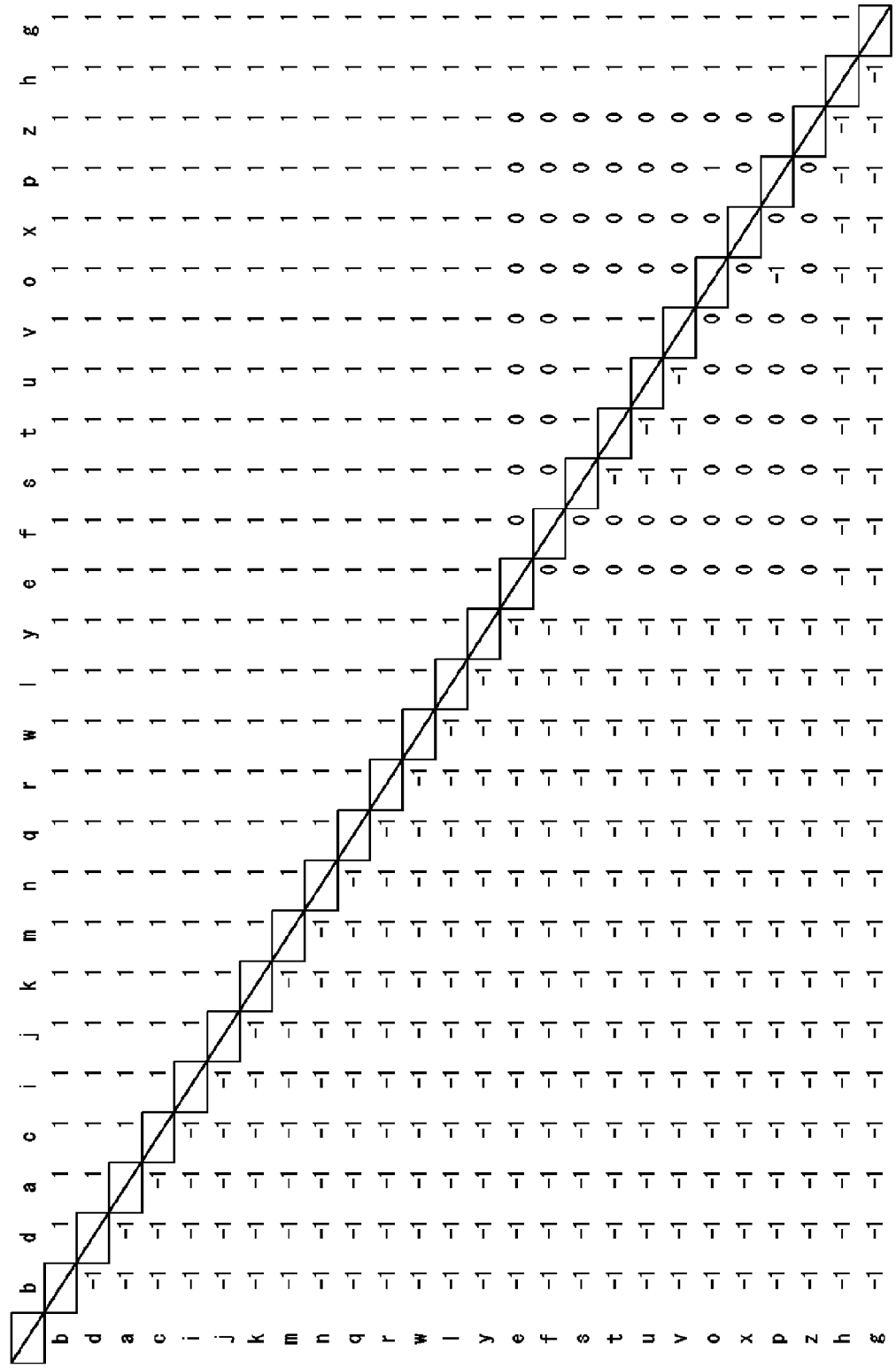
FIG. 15b shows processes rearranged in a performing order in the sub-order data 150.

FIG. 15a shows an example of sub-order data 150 generated with the determination system 10 of this embodiment. FIG. 15b shows processes rearranged in a performing order in the sub-order data 150. In this example, a numeric value illustrated as the sub-order data 150 is a value of the function doBefore described above. Identifiers of processes corresponding to the first argument to doBefore are arranged in the column direction, and identifiers of processes corresponding to the second argument to doBefore are arranged in the row direction. For example, doBefore[b][d] indicates an element on a row b and a column d, that is, "1". This means that the process b is determined to be performed before the process d.

Referring to the sub-order data 150, it is determined that the process b is performed first, and then processes d, a, c, i, j, k, m, n, q, r, w, l, and y are performed in this order. Further, it is determined that the processes h and g are performed last in this order. Further, although it is determined that the processes e, f, s, t, u, v, o, x, p, and z are performed after a process y and before a process h, a performing order of these processes is determined only partially. These sets are referred to as an undetermined set, a performing order of which has not been determined by the first determining component 610, the third determining component 620, and the second determining component 640. Subsequently, the scheduling component 650 determines a performing order of processes in the undetermined set by another method. The thus-determined performing order is performing order data 160.

Figure 16:
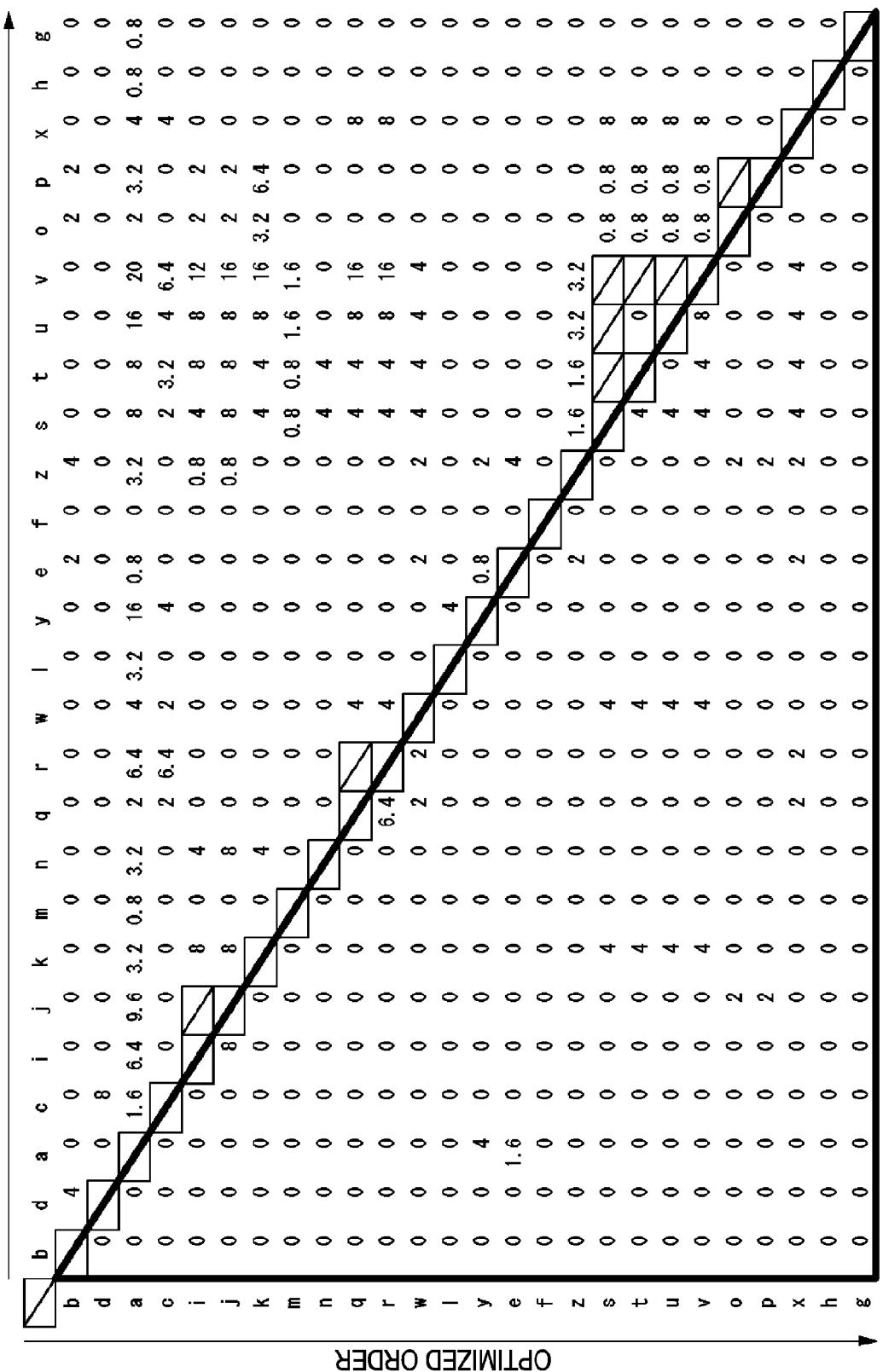
FIG. 16 shows an example of the performing order data 160 generated by the determination system 10 of this embodiment.

FIG. 16 shows an example of the performing order data 160 generated by the determination system 10 of this embodiment. FIG. 16 shows an expected value of time required to carry out a modification when processes are rearranged in the determined performing order. A numerical value at the lower left of the diagonal line is an expected value of time required to carry out a modification calculated in each combination of processes. For example, in the case of performing the processes i and j in this order, an expected value of time required to carry out a modification is 8 hours. The scheduling component 650 may display data in a table format as the performing order data 160 on a screen. Thus, an engineer can grasp the optimized order for design of a product such as an automobile to efficiently design the product by checking the screen. Further, the scheduling component 650 may calculate the total sum of expected value of time required to carry out a modification by adding numerical values at the lower left of the diagonal line, and display the calculated value together with the table-format data. In this example, 114 hours in total is displayed.

According to the determination system 10 described above with reference to FIGS. 1 to 16, the optimum performing order of most of the processes in the predetermined set can be determined through very quick processing of the first determining component 610 and the second determining component 640. As a result, a search space can be narrowed and the optimized order can be easily searched for. For example, the optimum performing order of the other processes can be determined by a conventional method such as exhaustive search within a practical period. Alternatively, an appropriate performing order can be determined manually or through a trial and error process.

Referring next to FIGS. 17 to 20, description is given of a process for more efficiently determining up to a performing order of processes in an undetermined set with the scheduling component 650.

Figure 17:
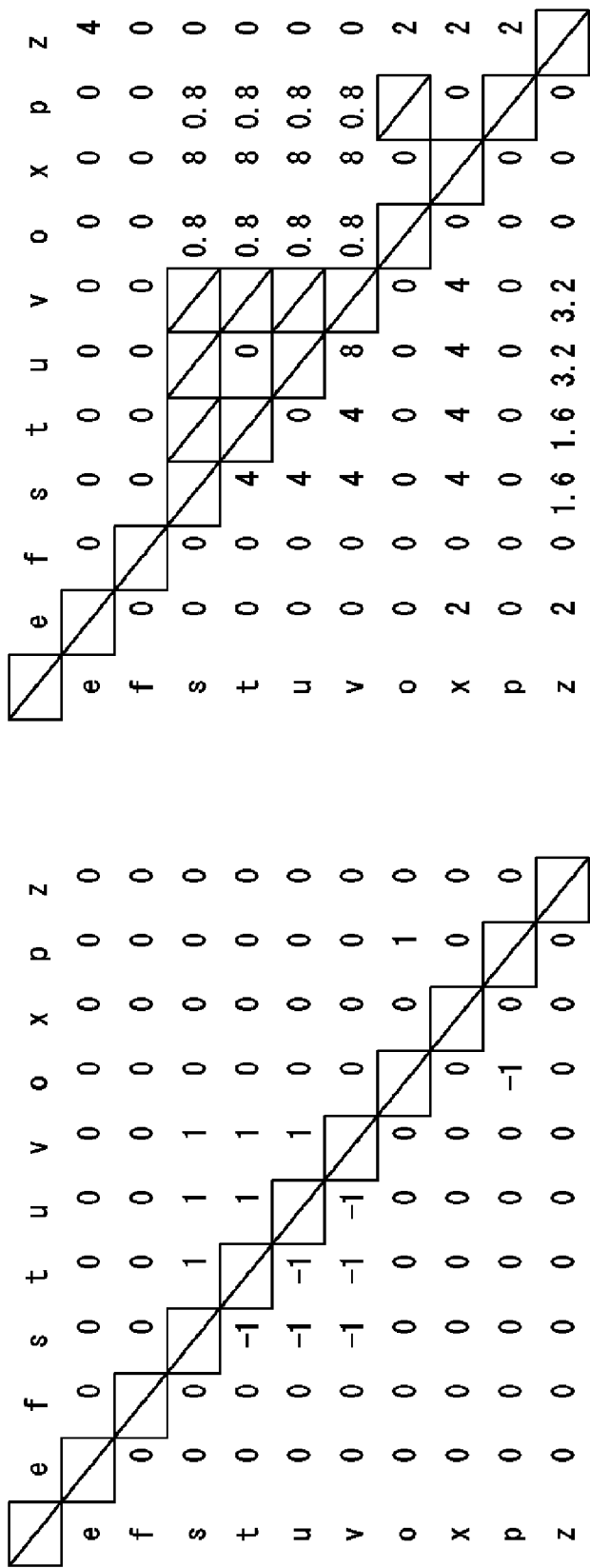
FIG. 17 shows an example of undetermined data 170 read by the scheduling component 650 of this embodiment.

FIG. 17 shows an example of undetermined data 170 read by the scheduling component 650 of this embodiment. The scheduling component 650 first selects a portion of the sub-order data 150 corresponding to processes in the undetermined set as indicated by the undetermined data 170, and reads the portion from the memory device 110 from the memory device 110. Further, the scheduling component 650 selects a portion of the expected value data 50 corresponding to processes in the undetermined set and reads the portion from the memory device 110. As apparent from the undetermined data 170, it is determined that the processes s, t, u, and v are performed in this order, but which process is performed first in the processes of the undetermined set, which process is performed last, or whether or not the other process is performed between these processes is not determined. Further, it is determined that the process o is performed before the process p, but how many processes precede or succeed these processes in the undetermined set is not determined.

The scheduling component 650 recursively uses the first determining component 610 and the second determining component 640 to determine a performing order of processes in the undetermined set on the basis of the undetermined data 170.

Figure 18:
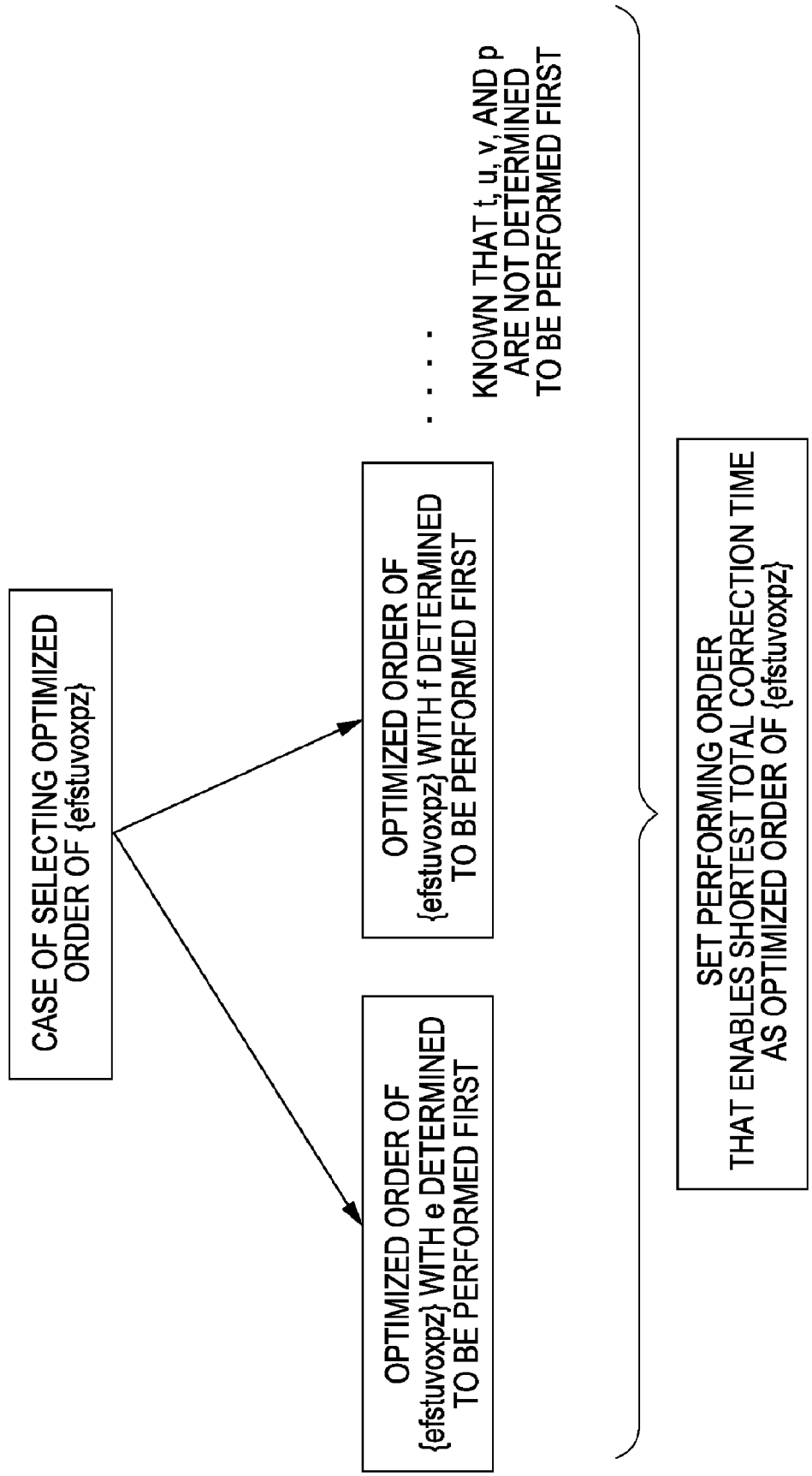
FIG. 18 schematically shows a process of the scheduling component 650 of this embodiment.

FIG. 18 schematically shows a process of the scheduling component 650 of this embodiment. The scheduling component 650 assumes that each of processes in the undetermined set {efstuvoxpz} is performed first in the undetermined set, and determines the optimum performing order of processes in the undetermined set on the above assumption. That is, for example, when the process e is performed first, the optimum performing order of the remaining processes is determined. Next, when the process f is performed first, the optimum performing order of the remaining processes is determined. Here, according to the undetermined data 170, it is determined that the processes t, u, v, and p are not performed first, so these processes are not assumed to be performed first.

Subsequently, a method of determining the optimum performing order under the above assumption is described. The scheduling component 650 determines a performing order in the undetermined set when a certain assumption is applied to the undetermined data 170, as the sub-problem data 175. FIG. 19 shows an example thereof.

FIG. 19 shows an example of the sub-problem data 175 output from the scheduling component 650 of this embodiment. If it is determined that the process e is performed first, the process e is to be performed before any other processes in the undetermined set. That is, doBefore[e][f] or doBefore[e][s] is "1". The scheduling component 650 generates the sub-problem data 175 and stores the generated data in the memory device 110. Then, the scheduling component 650 causes the first judging component 600, the first determining component 610, the third determining component 620, the second judging component 630, and the second determining component 640 to recursively perform processes similar to those described with reference to FIGS. 1 to 16 by referencing the sub-problem data 175, not the order constraint data 40. As a result, the optimum performing order under each assumption is determined. The scheduling component 650 calculates an expected value of time required to carry out a modification, for each of the thus-determined optimum performing orders. Then, the scheduling component 650 selects a performing order with the smallest expected value, and outputs the selected value.

As described above with reference to FIGS. 17 to 19, the scheduling component 650 applies a new assumption and determines a performing order of some processes, making it possible to determine up to a performing order of processes in the undetermined set with the first judging component 600, the first determining component 610, the third determining component 620, the second judging component 630, and the second determining component 640. Thus, the optimum performing order of all processes as well as some processes can be efficiently determined.

Figure 20:
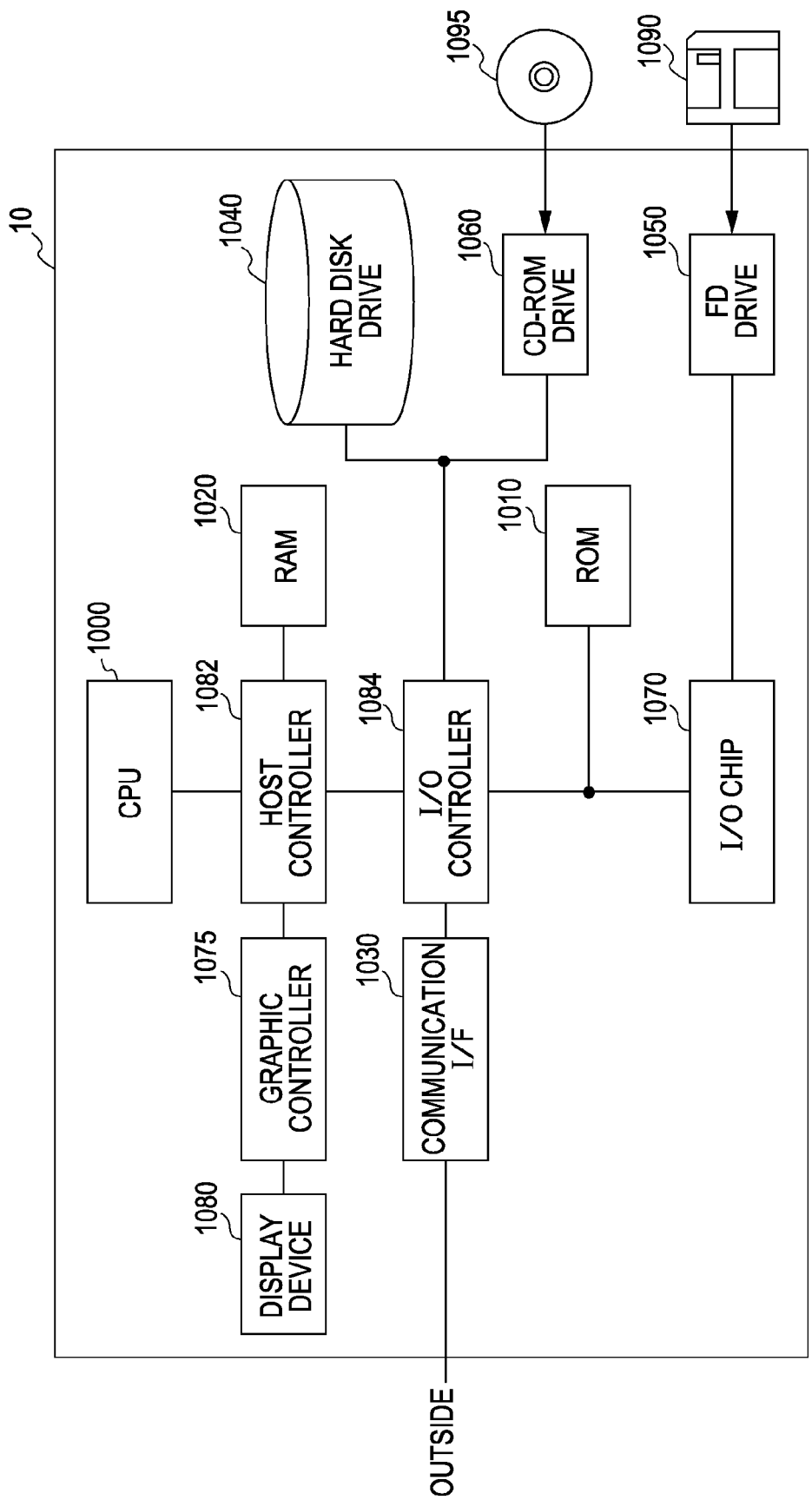
FIG. 20 shows a hardware component of a computer that functions as the determination system 10 of this embodiment.

FIG. 20 shows a hardware component of a computer that functions as the determination system 10 of this embodiment. The computer includes a CPU peripheral unit including a CPU 1000, a RAM 1020, and a graphic controller 1075 connected together by a host controller 1082, a communication interface 1030 connected to a host controller 1082 by an input/output controller 1084, an input/output unit including a hard disk drive 1040 and a CD-ROM drive 1060, a ROM 1010 connected to an input/output controller 1084, a flexible disk drive 1050, and a legacy input/output unit including a input/output chip 1070.

The host controller 1082 connects the RAM 1020, and the graphic controller 1075 and the CPU 1000 accessing the RAM 1020 at a high transfer rage. The CPU 1000 runs based on a program stored in the ROM 1010 and RAM 1020, and controls each component. The graphic controller 1075 retrieves image data generated on a frame buffer in the RAM 1020 by the CPU 1000 or the like and displays the image data on a display device 1080. The graphic controller 1075 may include a frame buffer for storing image data generated by the CPU 1000 or the like instead.

The input/output controller 1084 connects the host controller 1082 and higher-speed input/output devices, the communication interface 1030, the hard disk drive 1040, and the CD-ROM drive 1060. The communication interface 1030 communicates with an external device through a network. The hard disk drive 1040 stores programs and data necessary for the computer. The CD-ROM drive 1060 reads programs or data from the CD-ROM 1095 and supplies the read programs or data to the RAM 1020 or the hard disk drive 1040.

Further, the input/output controller 1084 is connected to the ROM 1010, the flexible disk drive 1050, the input/output chip 1070, or other such lower-speed input/output devices. The ROM 1010 stores a boot program executed by the CPU 1000 upon boot-up of the computer or programs dependent on hardware components of the computer. The flexible disk drive 1050 reads programs or data from the flexible disk 1090, and supplies the programs or data to the RAM 1020 or the hard disk drive 1040 through the input/output chip 1070. The input/output chip 1070 connects various input/output devices through, for example, a parallel port, a serial port, a keyboard port, a mouse port, or the like, and the flexible disk 1090.

Programs supplied to the computer are stored in the flexible disk 1090, the CD-ROM 1095, or a recording medium such as an IC card and provided to a user. The programs are read from the recording medium through the input/output chip 1070 and/or the input/output controller 1084, installed to the computer, and then executed. Operations performed by the computer or the like in accordance with the programs are the same as the operations of the determination system 10 illustrated in FIGS. 1 to 19, so description thereof is omitted.

The above programs may be stored in an external storage medium. Examples of the storage medium include, in addition to the flexible disk 1090 and the CD-ROM 1095, an optical recording medium such as a DVD or PD, a magneto-optic recording medium such as an MD, a tape medium, and a semiconductor memory such as an IC card. Further, a memory device such as a hard disk or a RAM provided in a server system connected to a dedicated communication network or Internet is used as a recording medium, and a program may be supplied to the computer through the network.

As described above with reference to FIGS. 1 to 20, according to the determination system 10 of this embodiment, a performing order of a plurality of processes having a complicated dependency relationship because of advanced processes can be determined so as to minimize required time therefore. The determination is completed very quickly compared to the exhaustive search or other such methods where calculation time is exponentially increased as the number of processes (that is, the number of elements to be determined for design) increases. Therefore, if the present invention is applied to actual product design such as automobile design, a development period thereof can be reduced or the extra time can be devoted to development of additional functions or improvement of quality.

The present invention is described above based on the embodiment, but the technical scope of the present invention is not limited to the above embodiment. Those skilled in the art would recognize that the embodiment can be modified or improved in many ways. For example, the judgment order in the first to third conditions is not limited to the above one but may be any other order in so far as determination as to whether each condition is satisfied is repeated. It is obvious from the description of the scope of claims that such modifications or improvements are included in the technical scope of the present invention.

I claim:

1. A system for determining a performing order of a plurality of processes, the system comprising:
a memory device that stores, for each combination of processes in the plurality of processes, an expected value of time required to carry out a modification necessary for matching a result of performing one of the plurality of processes to a result of performing another one of the plurality of processes, when the one of the plurality of processes is performed before the other one of the plurality of processes is performed;
a first judging device that judges whether or not a first condition is satisfied, for each combination of processes in the plurality of processes in which a primary process can be carried out before secondary process, using each expected value read from the memory device, the first condition being such that the time required to carry out a modification when the primary process is carried out before the secondary process is shorter than the time required to carry out a modification when the primary process is carried out after the secondary process;

a first determining device that determines to perform the primary process before the secondary process when the first condition is satisfied; and a scheduling device that determines a performing order of remaining processes in the plurality of processes in accordance with the performing order determined by the first determining device, and outputs the performing order determined;

wherein the first judging device further judges whether a second condition is satisfied, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary process;

the first determining device determines to perform the primary process after the secondary process when the second condition is satisfied;

wherein the plurality of processes are previously decided in order to design a specific product;

each one of the plurality of processes determines a design of a part of the specific product or a design of a step of a manufacturing process of the product; and the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed.

2. The system according to claim 1, wherein the first judging device further judges whether the second condition is satisfied, for each combination of processes in the plurality of processes in which the primary process can be carried out before a secondary processes, the second condition being such that the time required to carry out a modification when the primary process is carried out before any of the secondary processes is shorter than the time required to carry out a modification when the primary process is carried out after the secondary process, the first determining device determines to perform the primary process after the secondary process when the second condition is satisfied.

3. The system according to claim 2, wherein the first judging device decides each of the plurality processes that have not been determined to be performed before or after remaining processes in the plurality of processes as a primary process, and repeatedly judges whether the primary process satisfies the first condition or the second condition, until no primary process satisfies the first condition or the second condition, and the first determining device determines a performing order of the primary process and the secondary process each time the first judging device judges that the first condition or the second condition is satisfied.

4. The system according to claim 2, further comprising: the second judging device that judges whether or not a third condition is satisfied using each expected value read from the memory device, the third condition being such that time required to carry out a design change can be more reduced in a case of performing the primary process, each process in any subset of a set C consisting of processes that can be performed after the primary process and before the secondary process, or after the secondary process and before the primary process, and the secondary process in order, than in a case of performing the secondary process, each process in the subset, and the primary process in order; and a second determining device that determines to perform the primary process before the secondary process if the third condition is satisfied, wherein the scheduling device determines a performing order of remaining processes in the plurality of processes in accordance with the performing order determined by the first and the second determining devices.

5. The system according to claim 4 wherein the memory device stores an order constraint specifying that a predetermined process should be performed before the other process, the first judging device searches for secondary processes that can be performed before or after the primary process in accordance with the order constraint read from the memory device and the determined performing order, and judges whether or not the first condition or the second condition is satisfied, and a second judging device searches for a set of processes that can be performed after the primary process and before the secondary process or after the secondary process and before the primary process in accordance with the order constraint read from the memory and the determined performing order, and judges whether or not the third condition is satisfied.

6. The system according to claim 4, wherein a second judging device decides each combination of processes as the primary process and the secondary process in sequence, and repeatedly judges whether or not the combination of the primary process and the secondary process satisfies the third condition, for all the combinations of the primary process and the secondary process, and the second determining device determines a performing order of the primary process and the secondary process each time the second judging device judges that the third condition is satisfied.

7. The system according to claim 6, wherein the first judging device further decides each process that has not been determined to be performed before or after the other processes as the primary process in sequence after the second determining device determines a performing order, and repeatedly judges whether the primary process satisfies the first condition or the second condition, until no primary processes satisfy the first condition or the second condition, the second judging device further decides each combination of processes, a performing order of which has not been determined, as the primary process and the secondary process, after the first determining device determines the performing order, and repeatedly judges whether the combination of the primary process and the secondary process satisfies the third condition, until no combinations of the primary process and the secondary process satisfy the third condition, and the scheduling device determines a performing order of the other processes in accordance with a performing order determined by the first determining device and the second determining device based on a result of repeatedly performing the judgment with the first judging device and the second judging device, within a range of the determined performing order.

8. The system according to claim 4, wherein the second judging device calculates the expected reduction in time required to carry out a design change by performing the primary process before the secondary process as compared to performing the secondary process before the primary process, calculates a T sum of the increments in expected value of time required to carry out a design change in performing each process in the set C after the secondary process and before the primary process as compared to performing the process in the set C after the primary process and before the secondary process, and if the former expected reduction in required time is not smaller than a latter sum of increments in expected value, the third condition is determined satisfied.

9. The system according to claim 4, further comprising: a third determining device that determines to perform a third process that has been determined to be performed before the primary process before the secondary process, and determines to perform a fourth process that has been determined to be performed after the secondary process after the primary process, in accordance with a new performing order of the primary process and the secondary process determined by at least one of the first determining device and the second determining device.

10. The system according to claim 9, wherein the memory device further stores a plurality of order constraints that specify that the primary process should be performed before the secondary process, the third determining device determines that the third process that is defined to be performed before the primary process prescribed by a predetermined an order constraint, in accordance with the other order constraint, is performed before the secondary process prescribed by the order constraint, and determines that the fourth process that is defined to be performed after the secondary process in accordance with the other order constraint is performed after the primary process.

11. The system according to claim 4, wherein the scheduling device causes the first determining device and the second determining device to determine a performing order of the plurality of processes in an undetermined set including processes, a performing order of which is not determined by the first determining device and the second determining device, on assumption that each of the plurality of processes is performed first in the undetermined set, and the performing order that minimizes an expected value of required time for design value is selected from the determined performing orders and output.

12. A system for determining a performing order of a plurality of processes, comprising:
a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed;
a first judging device that judges whether or not a first condition that an expected value of time required to carry out a design change can be more reduced in a case of performing a primary process, each process in any subset of a set C including the plurality of processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;
a first determining device that determines to perform the primary process before the secondary process if the first condition is satisfied;
a scheduling device that determines a performing order of remaining processes in the plurality of processes within a range of the performing order determined by the second determining device, and outputs the performing order determined;

wherein the first judging device further judges whether a second condition is satisfied, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary process;
the first determining device determines to perform the primary process after the secondary process when the second condition is satisfied;
wherein the plurality of processes are previously decided in order to design a specific product;
each one of the plurality of processes determines a design of a part of the specific product or a design of a step of a manufacturing process of the product; and
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed.

13. A program product that causes a computer to function as a system determining a performing order of a plurality of processes,
the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:
a first judging device that judges whether or not a first condition is satisfied, for each combination of processes in the plurality of processes in which a primary process can be carried out before a secondary process, in accordance with each expected value read from then the secondary process is performed before the primary process for each combination of processes in the plurality of processes in which a primary process can be carried out before a secondary process, is satisfied in accordance with each expected value read from the memory device;
a first determining device that determines to perform the primary process before the secondary process when the first condition is satisfied;
a scheduling device that determines a performing order of remaining processes in the plurality of processes within a range of the performing order determined by the first determining device, and outputs the performing order determined;
wherein the first judging device further judges whether a second condition is satisfied, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary processes;

the first determining device determines to perform the primary process after the secondary processes when the second condition is satisfied;
wherein the plurality of processes are previously decided in order to design a specific product;
each one of the plurality of processes determines a design of a part of the specific product or a design of a step of a manufacturing process of the product; and
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed.

14. A program product that causes a computer to function as a system determining a performing order of a plurality of processes,
the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:
a first judging device that judges whether or not a first condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;
a first determining device that determines to perform the primary process before the secondary process if the first condition is satisfied;
a scheduling device that determines a performing order of remaining processes in the plurality of processes within a range of the performing order determined by the second determining device, and outputs the performing order determined;
wherein the first judging device further judges whether a second condition is satisfied, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary processes;
the first determining device determines to perform the primary process after the secondary processes when the second condition is satisfied;
wherein the plurality of processes are previously decided in order to design a specific product;
each one of the plurality of processes determines a design of a part of the specific product or a design of a step of a manufacturing process of the product; and
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed.

15. A method of a determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:
judging whether or not a first condition that time required to carry out a modification when a secondary process is performed after a primary process is shorter than time required to carry out a modification when the secondary process is performed before the primary process for each combination of processes in the plurality of processes in which a primary process can be carried out before a secondary process, is satisfied in accordance with each expected value read from the memory device;
determining that the primary process is performed before all the secondary processes when the first condition is satisfied;
determining a performing order of remaining processes in the plurality of processes within a range of the performing order determined by the determining step and outputting the determined performing order;
wherein the plurality of processes are previously decided in order to design a specific product;
each one of the plurality of processes determines a design of a part of the specific product or a design of a step of a manufacturing process of the product;
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;
wherein the first judging device further judges whether a second condition is satisfied, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary processes; and
the first determining device determines to perform the primary process after the secondary processes when the second condition is satisfied.

16. A method of determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:

judging whether or not a first condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

determining that the primary process is performed before the secondary process if the first condition is satisfied;

determining a performing order of remaining processes in the plurality of processes within a range of the performing order determined by the determining step and outputting the determined performing order;

wherein judging whether a second condition is satisfied by the first judging device, for each combination of processes in the plurality of processes in which the primary process can be carried out after the secondary process, the second condition being such that the time required to carry out a modification when the primary process is carried out after any of the secondary process is shorter than the time required to carry out a modification when the primary process is carried out before any of the secondary processes, determining by a first determining device to perform the primary process after the secondary processes when the second condition is satisfied;

wherein the plurality of processes are previously decided in order to design a specific product;

each one of the plurality of processes determines a design of a part of the specific product or a design of a step of a manufacturing process of the product; and the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed.

17. A system for determining a performing order of a plurality of processes, the system comprising:

a memory device that stores, for each combination of processes in the plurality of processes, an expected value of time required to carry out a modification necessary for matching a result of performing one of the plurality of processes to a result of performing another one of the plurality of processes, when the one of the plurality of processes is performed before the other one of the plurality of processes is performed;

a first judging device that judges whether or not a first condition is satisfied, for each combination of processes in the plurality of processes in which a primary process can be carried out before secondary process, using each expected value read from the memory device, the first condition being such that the time required to carry out a modification when the primary process is carried out before the secondary process is shorter than the time required to carry out a modification when the primary process is carried out after the secondary process;

a first determining device that determines to perform the primary process before the secondary process when the first condition is satisfied;

a scheduling device that determines a performing order of remaining processes in the plurality of processes in accordance with the performing order determined by the first determining device, and outputs the performing order determined;

wherein the plurality of processes are previously decided in order to design a specific product;

each one of the plurality of processes determines a design of a part of the specific product or a design of a step of a manufacturing process of the specific product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;

wherein the plurality of processes are previously determined for designing an automobile;

each of the plurality of processes determines at least a part of shapes and materials of devices of the automobile or determines at least a step of a production process of the automobile; and the scheduling device determines a performing order of remaining processes in the plurality of processes within a range of the performing order determined by the first determining device, and outputs the performing order determined as a design order of the automobile.

18. A system for determining a performing order of a plurality of processes, the system comprising:

a memory device that stores, for each combination of processes in the plurality of processes, an expected value of time required to carry out a modification necessary for matching a result of performing one of the plurality of processes to a result of performing another one of the plurality of processes, when the one of the plurality of processes is performed before the other one of the plurality of processes is performed;

a first judging device that judges whether or not a first condition is satisfied, for each combination of processes in the plurality of processes in which a primary process can be carried out before secondary process, using each expected value read from the memory device, the first condition being such that the time required to carry out a modification when the primary process is carried out before the secondary process is shorter than the time required to carry out a modification when the primary process is carried out after the secondary process;

a first determining device that determines to perform the primary process before the secondary process when the first condition is satisfied;

a scheduling device that determines a performing order of remaining processes in the plurality of processes in accordance with the performing order determined by the first determining device, and outputs the performing order determined;

wherein the plurality of processes are previously decided in order to design a specific product;

each one of the plurality of processes determines a design of a part of the specific product or a design of a step of a manufacturing process of the product, the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

19. A system for determining a performing order of a plurality of processes, comprising:

a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed;

a first judging device that judges whether or not a first condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

a first determining device that determines to perform the primary process before the secondary process if the first condition is satisfied; and a scheduling device that determines a performing order of remaining processes in the plurality of processes within a range of the performing order determined by the second determining device, and outputs the performing order determined;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;

wherein the plurality of processes are previously determined for designing an automobile;

each of the processes determines at least a part of shapes and materials of devices of the automobile or determines at least a step of a production process of the automobile; and the scheduling device determines a performing order of remaining processes in the plurality of processes within a range of the performing order determined by the first determining device, and outputs the performing order determined as a design order of the automobile.

20. A system for determining a performing order of a plurality of processes, comprising:

a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed;

a second judging device that judges whether or not a third condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

a second determining device that determines to perform the primary process before the secondary process if the third condition is satisfied;

a scheduling device that determines a performing order of remaining processes in the plurality of processes within a range of the performing order determined by the second determining device, and outputs the performing order determined;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

21. A program product that causes a computer to function as a system determining a performing order of a plurality of processes, the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:

a first judging device that judges whether or not a first condition is satisfied, for each combination of processes in the plurality of processes in which a primary process can be carried out before a secondary process, in accordance with each expected value read from then the secondary process is performed before the primary process for each combination of processes in the plurality of processes in which a primary process can be carried out before a secondary process, is satisfied in accordance with each expected value read from the memory device;

a first determining device that determines to perform the primary process before the secondary process when the first condition is satisfied;

a scheduling device that determines a performing order of remaining processes in the plurality of processes within a range of the performing order determined by the first determining device, and outputs the performing order determined;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;

wherein the plurality of processes are previously determined for designing an automobile;

each of the processes determines at least a part of shapes and materials of devices of the automobile or determines at least a step of a production process of the automobile; and the scheduling device determines a performing order of remaining processes in the plurality of processes within a range of the performing order determined by the first determining device, and outputs the performing order determined as a design order of the automobile.

22. A program product that causes a computer to function as a system determining a performing order of a plurality of processes, the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:

a first judging device that judges whether or not a first condition is satisfied, for each combination of processes in the plurality of processes in which a primary process can be carried out before a secondary process, in accordance with each expected value read from then the secondary process is performed before the primary process for each combination of processes in the plurality of processes in which a primary process can be carried out before a secondary process, is satisfied in accordance with each expected value read from the memory device;

a first determining device that determines to perform the primary process before the secondary process when the first condition is satisfied;

a scheduling device that determines a performing order of remaining processes in the plurality of processes within a range of the performing order determined by the first determining device, and outputs the performing order determined;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

23. A program product that causes a computer to function as a system determining a performing order of a plurality of processes, the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:

a second judging device that judges whether or not a third condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

a second determining device that determines to perform the primary process before the secondary process if the third condition is satisfied;

a scheduling device that determines a performing order of remaining processes in the plurality of processes within a range of the performing order determined by the second determining device, and outputs the performing order determined;
wherein the plurality of processes are previously decided in order to design a specific product;
each one of the plurality of processes determines a design of a part of the specific product or a design of a step of a manufacturing process of the product;
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;
wherein the plurality of processes are previously determined for designing an automobile;
each of the processes determines at least a part of shapes and materials of devices of the automobile or determines at least a step of a production process of the automobile; and
the scheduling device determines a performing order of remaining processes in the plurality of processes within a range of the performing order determined by the first determining device, and outputs the performing order determined as a design order of the automobile.

24. A program product that causes a computer to function as a system determining a performing order of a plurality of processes,
the computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, and the computer being imparted with the functions of:
a second judging device that judges whether or not a third condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;
a second determining device that determines to perform the primary process before the secondary process if the third condition is satisfied;
a scheduling device that determines a performing order of remaining processes in the plurality of processes within a range of the performing order determined by the second determining device, and outputs the performing order determined;
wherein the plurality of processes are previously decided in order to design a specific product;
each one of the plurality of processes determines a design of a part of the specific product or a design of a step of a manufacturing process of the product;
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and
further comprising: an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

25. A method of a determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:
judging whether or not a first condition that time required to carry out a modification when a secondary process is performed after a primary process is shorter than time required to carry out a modification when the secondary process is performed before the primary process for each combination of processes in the plurality of processes in which a primary process can be carried out before a secondary process, is satisfied in accordance with each expected value read from the memory device;
determining that the primary process is performed before all the secondary processes when the first condition is satisfied;
determining a performing order of remaining processes in the plurality of processes within a range of the performing order determined by the determining step and outputting the determined performing order;
wherein the plurality of processes are previously decided in order to design a specific product;
each one of the plurality of processes determines a design of a part of the specific product or a design of a step of a manufacturing process of the product;
the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;
wherein the plurality of processes are previously determined for designing an automobile;
each of the processes determines at least a part of shapes and materials of devices of the automobile or determines at least a step of a production process of the automobile; and
the scheduling device determines a performing order of remaining processes in the plurality of processes within a range of the performing order determined by the first determining device, and outputs the performing order determined as a design order of the automobile.

26. A method of a determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:

judging whether or not a first condition that time required to carry out a modification when a secondary process is performed after a primary process is shorter than time required to carry out a modification when the secondary process is performed before the primary process for each combination of processes in the plurality of processes in which a primary process can be carried out before a secondary process, is satisfied in accordance with each expected value read from the memory device;

determining that the primary process is performed before all the secondary processes when the first condition is satisfied;

determining a performing order of remaining processes in the plurality of processes within a range of the performing order determined by the determining step and outputting the determined performing order;

wherein the plurality of processes are previously decided in order to design a specific product;

each one of the plurality of processes determines a design of a part of the specific product or a design of a step of a manufacturing process of the product, the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

27. A method of determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:

judging whether or not a third condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

determining that the primary process is performed before the secondary process if the third condition is satisfied;

determining a performing order of remaining processes in the plurality of processes within a range of the performing order determined by the determining step and outputting the determined performing order;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed;

wherein the plurality of processes are previously determined for designing an automobile;

each of the processes determines at least a part of shapes and materials of devices of the automobile or determines at least a step of a production process of the automobile; and the scheduling device determines a performing order of remaining processes in the plurality of processes within a range of the performing order determined by the first determining device, and outputs the performing order determined as a design order of the automobile.

28. A method of determining a performing order of a plurality of processes with a computer including a memory device that stores, for each combination of processes, an expected value of time required to carry out a modification necessary for matching a result of performing one of the plurality of processes to a result of performing another one of the plurality of processes, when the one of the plurality of processes is performed before the other one of the plurality of processes is performed, comprising:

judging whether or not a third condition that an expected value of time required to carry out a design change can be more reduced in a case of performing a primary process, each process in any subset of a set C including processes that can be performed after the primary process and before a secondary process, or after the secondary process and before the primary process, and the secondary process in order, than in a case of performing the secondary process, each process in the subset, and the primary process in order, is satisfied in accordance with each expected value read from the memory device;

determining that the primary process is performed before the secondary process if the third condition is satisfied;

determining a performing order of remaining processes in the plurality of processes within a range of the performing order determined by the determining step and outputting the determined performing order;

wherein the plurality of processes are previously decided in order to design a specific product;

each one of the plurality of processes determines a design of a part of the specific product or a design of a step of a manufacturing process of the product;

the memory device that further stores, for each combination of processes in the plurality of processes, an expected value of time required to carry out a design change necessary for matching a design determined by one of the plurality of processes to a design determined by another one of the plurality of processes, when the one of the plurality of processes is performed before the other one of the plurality of processes is performed; and an input device that receives input data about a probability that a modification is performed to match a result of performing one of the plurality of processes to a result of performing another one of the plurality of processes, when the one of the plurality of processes is performed before the other one of the plurality of processes is performed, and input data about processing time required for matching the result of the one process to the result of the other process for each combination of processes, and calculates the product of the probability and the required time received for each combination of processes to store the product as an expected value of the processing time in the memory device.

* * * * *